(12) United States Patent
Kalogridis et al.

(10) Patent No.: US 10,557,721 B2
(45) Date of Patent: Feb. 11, 2020

(54) DEVICE AND METHOD FOR ANONYMISING SMART METERING DATA

(75) Inventors: Georgios Kalogridis, Bristol (GB); Costas Efthymiou, Bristol (GB); Mahesh Sooriyabandara, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 1264 days.

(21) Appl. No.: 13/095,216

(22) Filed: Apr. 27, 2011

(65) Prior Publication Data
US 2011/0271352 A1    Nov. 3, 2011

(30) Foreign Application Priority Data

Apr. 28, 2010   (GB) .................................. 1007110.8

(51) Int. Cl.
*G01D 4/02*    (2006.01)
*H04L 29/06*   (2006.01)

(52) U.S. Cl.
CPC ........... *G01D 4/02* (2013.01); *H04L 63/0421* (2013.01); *H04Q 2209/60* (2013.01); *Y04S 40/24* (2013.01)

(58) Field of Classification Search
None
See application file for complete search history.

(56) References Cited

U.S. PATENT DOCUMENTS

| | | | | |
|---|---|---|---|---|
| 5,847,711 A | * | 12/1998 | Kaufman | G06T 1/20 345/424 |
| 2003/0061091 A1 | * | 3/2003 | Amaratunga | G06Q 10/06375 705/7.31 |
| 2007/0096765 A1 | * | 5/2007 | Kagan | 324/765 |
| 2009/0045804 A1 | * | 2/2009 | Durling et al. | 324/140 R |
| 2009/0063228 A1 | | 3/2009 | Forbes, Jr. | |
| 2010/0010939 A1 | * | 1/2010 | Arfin et al. | 705/412 |
| 2010/0117808 A1 | * | 5/2010 | Karam | 340/310.16 |
| 2011/0066258 A1 | * | 3/2011 | Torzhkov et al. | 700/29 |
| 2011/0239013 A1 | * | 9/2011 | Muller | 713/320 |

FOREIGN PATENT DOCUMENTS

| | | |
|---|---|---|
| EP | 1 633 077 A2 | 3/2006 |
| EP | 1 633 077 A3 | 3/2006 |
| GB | 2 297 850 A | 8/1996 |
| GB | 2 341 934 A | 3/2000 |
| JP | 2002-48598 | 2/2002 |

(Continued)

OTHER PUBLICATIONS

Office Action dated Sep. 11, 2012, in Japanese Patent Application No. 2011-100479 (with English-language translation).

(Continued)

*Primary Examiner* — Jamie R Kucab
(74) *Attorney, Agent, or Firm* — Oblon, McClelland, Maier & Neustadt, L.L.P.

(57) ABSTRACT

A device comprising an input for obtaining consumption data relating to the consumption of a utility provided by a utility provider, an output for outputting modified consumption data and a processor arranged to generate the modified consumption data based on obtained consumption data so that the modified consumption data starts to converge with the obtained consumption data if a deviation of the obtained consumption data from the modified consumption data exceeds a predetermined threshold.

8 Claims, 14 Drawing Sheets

(56) References Cited

FOREIGN PATENT DOCUMENTS

| JP | 2002-74572 A | 3/2002 |
|---|---|---|
| JP | 2004-280499 | 10/2004 |
| JP | 2006-291759 | 10/2006 |
| JP | 2007-249893 A | 9/2007 |
| JP | 2011-155713 A | 8/2011 |
| JP | 2011-188620 A | 9/2011 |
| WO | WO 2009/103998 A2 | 8/2009 |
| WO | WO 2010/028220 A2 | 3/2010 |

OTHER PUBLICATIONS

Office Action dated Dec. 11, 2012, in Japanese Patent Application No. 2011-100479 (with English-language translation).
Combined Search and Examination Report dated Sep. 6, 2010, in United Kingdom Patent Application No. GB1007110.8.
Combined Search and Examination Report dated Nov. 29, 2011, in United Kingdom Patent Application No. GB1101014.7.
Combined Search and Examination Report dated Jun. 1, 2012, in United Kingdom Patent Application No. GB1206189.1.
Ali Ipakchi, et al., "Grid of the Future: Are We Ready to Transition to a Smart Grid?", IEEE Power & Energy Magazine, vol. 7, Part 2, Mar./Apr. 2009, pp. 52-62.
Annabelle Lee, et al., "Smart Grid Cyber Security Strategy and Requirements", Draft NISTIR 7628, The Cyber Security Coordination Task Group, Advanced Security Acceleration Project—Smart Grid, National Intitute of Standards and Technology, Sep. 2009, 236 pages.
"AMI System Security Requirements", UCAIUG: AMI-SEC-ASAP, V1.01, Dec. 17, 2008, 111 pages.
Elias Leake Quinn, "Privacy and the New Energy Infrastructure", Center for Energy and Environmental Security (CEES), CEES Working Paper No. 09-001, http://ssrn.com/abstract=1370731, Fall 2008, 43 pages.
Christopher Laughman, et al., "Power Signature Analysis: Advanced Nonintrusive Monitoring of Electric Loads", IEEE Power & Energy Magazine, Mar./Apr. 2003, pp. 56-63.
George W. Hart, "Nonintrusive Appliance Load Monitoring", Proceedings of the IEEE, vol. 80, No. 12, Dec. 1992, pp. 1870-1872.
H. Y. Lam, et al., "A Novel Method to Construct Taxonomy of Electrical Appliances Based on Load Signatures", IEEE Transactions on Consumer Electronics, vol. 53, No. 2, May 2007, pp. 653-660.
A. Prudenzi, "A Neuron Nets Based Procedure for Identifying Domestic Appliances Pattern-of-Use from Energy Recordings at Meter Panel", IEEE Power Engineering Society Winter, 2002, pp. 941-946.
Rebecca Herold, "Smart Grid Privacy Concerns", Privacy Professor, http:www.privacyguidance.com/files/SmartGrid_PrivacyHeroldOct2009.pdf, Oct. 2009, 3 pages.
Office Action dated May 7, 2014 in Japanese Application No. 2013-097703 (w/English translation).

* cited by examiner

DEVICE AND METHOD FOR ANONYMISING SMART METERING DATA

This application is based upon and claims the benefit of priority from United Kingdom patent application No. 1007110.8, filed on 28 Apr. 2010; the entire contents of which are incorporated herein by reference.

FIELD

Embodiments described herein relate generally to a device and method for anonymising smart metering data.

BACKGROUND

Smart grids are an emerging engineering challenge. A discussion of the forms a smart grid can take can be found in A. Ipakchi and F. Albuyeh. Grid of the future. IEEE Power and Energy Magazine, 7(2):52-62, 2009. A smart grid may be viewed a system that itself unifies a number of sub-systems. A smart grid further merges multiple engineering technologies, such as electric power and control systems and telecommunication and information technology systems.

A smart grid is considered to intelligently integrate and optimise the functionalities of its components, to efficiently deliver sustainable, economic and secure electricity supplies. It may employ products and services together with monitoring, control, communications and self-healing technologies to offer a wide range of new services, such as improved grid connectivity, optimised consumer power supply or power reserve, improved customer services, control of the environmental impact and enhanced levels of reliability and security of supply.

Smart grids moreover differ from common (legacy) grids in that they interconnect smart grid components with a two-way communications network. This two-way connection enables energy suppliers and customers to exchange information, if required in an interactive and/or real-time manner. Information exchange of this nature can support features such as load shedding, consumption management, distributed energy storage (e.g. in electric cars) and distributed energy generation (e.g. from renewable resources).

Smart grids may further use an advanced metering infrastructure (AMI) and automated meter reading (AMR). The role of smart meters in an advanced metering infrastructure is pivotal. Smart meters, which are usually electrical meters but could also incorporate other metering devices, such as device metering gas, water and/or heat consumption, measure power consumption in much more detail than conventional meters. It is moreover anticipated that future smart meters will have the ability to communicate collected information to third parties, in particular the provider of a utility in question, i.e. the electricity provider.

The information security of smart grid data and advanced metering data is of paramount importance. Implementing and analysing smart grid security is a challenging task, especially when considering the scale of the potential damages that could be caused by attacks and by the compromising of advanced metering data. A classification of smart grid risks and vulnerabilities has been published by the National Institute of Standards and Technology (NIST) (see A. Lee and T. Brewer, "Smart grid Cyber Security Strategy and Requirements. Technical Report DRAFT" NISTIR 7628, The Cyber Security Coordination Task Group, Advanced Security Acceleration Project, National Institute of Technology, September 2009). In addition, a comprehensive specification of Advanced Metering Infrastructure security requirements has been published by OpenSG ("AMI System Security Requirements", Technical Report AMI-SEC TF, OpenSG, December 2008).

The dangers of metering data to privacy have been widely discussed (see, for example, stories published by Smart Grid News.com (http://www.smartgridnews.com/artman/publish/industry/The_Dangers_of_Meter_Data_Part_1.html) by the Washington Post (http://voices.washingtonpost.com/securityfix/2009/11/experts_smart_grid_poses_priva.html), another story published at http://information-security-resources.com/2009/11/15/fifteen-more-smart-grid-privacy-concerns and papers by Quinn ("Privacy and the New Energy Infrastructure", available at http://papers.ssrn.com/sol3/papers.cfm?abstract_id=1370731) and P. McDaniel, and S. McLaughlin, ("Security and Privacy Challenges in the Smart Grid", IEEE Security & Privacy, 75-77, 2009). Quinn argues that in the future advanced metering Infrastructure will provide a window into the activities within homes, exposing private activities to anyone with access to electricity usage information. As more and more detailed data about home energy usage is pouring into utilities, the resolution and quality of information that can be gleaned from that raw data is increasing. Quinn moreover argues that modern analytical techniques can, based on an electricity usage profile, identify the use of individual appliances within homes, and will in the foreseeable future be able to pinpoint exactly who, how, and when someone has operated these home appliances. For example, it may be possible to recognise when a resident showers, watches TV, and goes to bed in the night. The privacy threat smart metering imposes hereby goes beyond the threat of private information being exposed to another individual. The privacy threat associated with smart metering is that smart metering can allow the collating and analysing of the collected personal data on an industrial scale.

Despite the threats to users' privacy, it is envisaged that more detailed power usage information will be required in the future to:

To enable demand response functionality and sustainable load management.

To accommodate variable input from renewable resources.

To drive consumer actions through awareness and social pressure with demand-side management.

The granularity of the data acquired by smart meters may vary widely. The Solarwave Smart Sub Meter, for example (see http://www.solarwave.ie/HowItWorks.htm) meters power consumption at fifteen-minute intervals as a default but is capable of taking data every minute.

The information that can be gleaned from the processing of power profiles that can be generated by smart meters and subsequently provided to utility companies can currently be demonstrated with the use of non-intrusive appliance load monitors (NALM) (see, for example, C. Laughman et al., "Advanced Nonintrusive Monitoring of Electric Loads, IEEE Power and Energy, 56, March/April 2003). Non-intrusive appliance load monitors can be used for constructing appliance models. Appliance models can be separated into two basic types: on/off models, and finite state machine models. Appliance models can then be used to track appliance behaviour, as illustrated, for example, by G. W. Hart in "Nonintrusive Appliance Load Monitoring", 80 Proceedings of the IEEE 1870, 1871-72, Dec. 1992.

There is moreover a rich and ongoing line of research in the construction and upkeep of appliance libraries and detection algorithms, as illustrated, for example, by H. Y. Lam & W. K. Lee in "A Novel Method to Construct Taxonomy of Electrical Appliances Based on Load Signatures", 53 IEEE Transactions On Consumer Electronics 653, 2007. By way of example, FIGS. 1 and 2 show two signature load profiles (with different time granularity) for a house, from which a large amount of personal information can be extracted, as indicated.

Even when household power profiles are aggregated, researchers have shown (with the use of artificial neural networks) that they can pinpoint the use of washing machines, dishwashers and water heaters with accuracy rates of over 90% from within the noise of the aggregated load information (see, for example, A. Prudenzi, "A Neuron Nets Based Procedure for Identifying Domestic Appliances Pattern-of-Use from Energy Recordings at Meter Panel", IEEE Power Engineering Society Winter Meeting 941, 942 col. 1, 2002).

The full extent of privacy concerns is not yet fully understood. A good list of privacy threats is given by Rebecca Herold (from NIST) and can be found at http://www.privacyguidance.com/files/SmartGrid_PrivacyHeroldOct2009.pdf. These considerations have been neatly summarised in a report from a NIST expert: "The major benefit provided by the Smart Grid, i.e. the ability to get richer data to and from customer meters and other electric devices, is also its Achilles' heel from a privacy viewpoint."

Current art for protecting smart metering data privacy is focusing on policy formulation and enforcement in the domains that will be managing this data (e.g. in the utility provider domain).

BRIEF DESCRIPTION OF THE DRAWINGS

Embodiments will be described in the following by way of example only and with reference to the accompanying drawings, in which.

DETAILED DESCRIPTION

Figure 1:
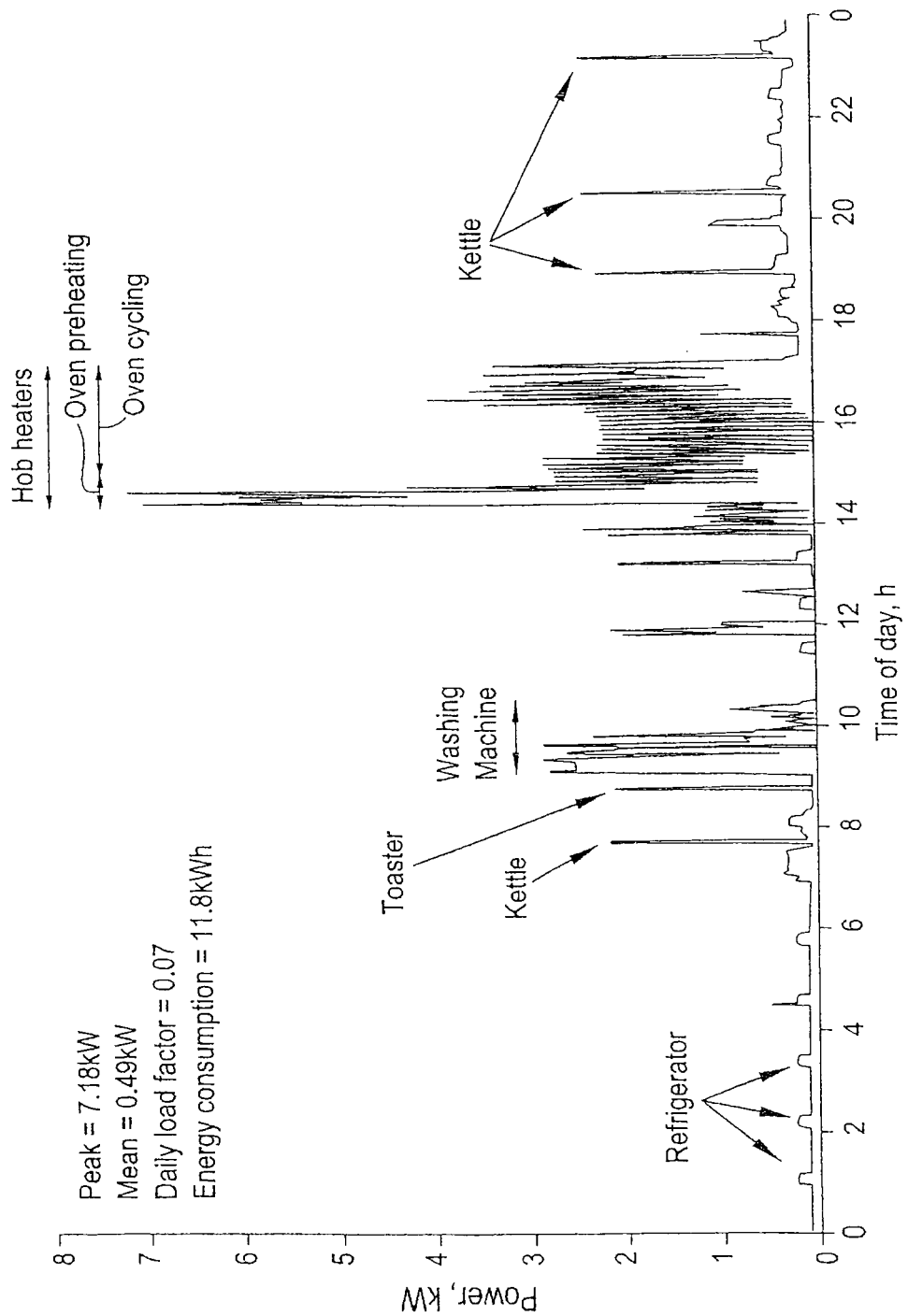
FIG. 1 shows a Household Load Signature recorded on a one-minute time base.

A device comprising an input for obtaining consumption data relating to the consumption of a utility provided by a utility provider, an output for outputting modified consumption data and a processor arranged to generate the modified consumption data based on obtained consumption data so that the modified consumption data starts to converge with the obtained consumption data if a deviation of the obtained consumption data from the modified consumption data exceeds a predetermined threshold.

Also disclosed is a device comprising an input for obtaining consumption data relating to the consumption of a utility provided by a utility provider and an output for outputting modified consumption data. The device further comprises a processor arranged to generate the modified consumption data based on the obtained consumption data and based on stored rules for anonymising the consumption data. An input of the device (this can be a further input) can be provided to allow the utility provider or a user of the device to set, modify and/or delete the stored rules.

The utility may be consumed by an end consumer of the utility and the consumption data may reflect the amount of the utility consumed. An end consumer can be a building or house, be provided or located within a building or house, be part of a building or house, be provided/located within a part of a building or house, be a household or form part of a household or be any other power consumer unit that may be individually monitored using a smart meter.

The rules may, for example comprise boundary conditions within which the device is permitted to operate or maximum values (such as maximum values of allowed deviations between the consumption data and the modified consumption data). These boundary conditions and/or maximum values may be set by the utility provider and the device may be arranged to only accept the setting, modifying and/or deleting of such boundary conditions and/or maximum values by the utility provider, for example following an authorisation routine. A data signal conveying the boundary conditions to the device may be superimposed over a mains power connection in the form of a high frequency signal that can be extracted from the mains power using a high pass filter, in particular if the consumed utility is electric power. Additionally or alternatively, the data signal conveying the boundary conditions to the device may be communicated over other wired networks (such as cable, public telephone networks and Internet), or wireless networks (such as WiFi, WiMax, Bluetooth, ZigBee, sensor networks, and cellular networks). The predetermined threshold and/or the convergence factor may be stored within the device and/or altered as desired by the user and/or the utility provider.

The actual operating parameters based on which the rules operate may be the same as the maximum values or may be set such that the rules operate within the conditions specified by the utility provider. The device may have an input that allows an owner or user of the device to independently set such operating parameters, as long as they are within the boundaries defined by the utility provider.

The boundary conditions may, for example be such that the device is given a degree of freedom in allowing deviations between the consumption data and the modified consumption data, as long as these deviations are below a/the predetermined threshold. In this manner the utility provider can ensure that power consumption by an entity (such as a house or household, a business, building or part of a building etc.) is realistically reported albeit with some degree of uncertainty. This degree of uncertainty can be used by the device for anonymising the consumption data.

In another embodiment there is provided a device comprising an input for obtaining consumption data relating to the consumption of a utility provided by a utility provider and an output for outputting modified consumption data. The device also comprises a processor arranged to generate the modified consumption data based on the obtained consumption data so that the modified consumption data starts to converge with the consumption data if a deviation of the consumption data from the modified consumption data exceeds a predetermined threshold.

Different ways of measuring or determining deviation are envisaged. A deviation between the consumption data and the modified consumption data can, for example, be simply the difference between a consumed amount and a modified consumed amount. The consumed and modified consumed amounts can be measured/expressed in terms of the amount consumed over several measurements cycles, for example since the beginning of a monitoring period or, alternatively, in terms of a consumed amount that has been consumed in a single measurement period, which may immediately precede a point in time at which a modified consumption data point is calculated. The deviation may be expressed in relative terms, for example as a percentage of a total amount consumed in a particular time period, such as in the time period since the beginning of a measurement/monitoring period or over the single measurement period immediately preceding the point in time at which a modified consumption data point is calculated.

The device may not only store boundaries/threshold values for activating routines designed to cause a convergence between the consumption data and the modified consumption data. Instead or additionally the device may further store the conditions that are to govern the operation of a routine designed to cause such convergence.

According to another embodiment there is provided a device comprising an input for obtaining consumption data relating to the consumption of a utility provided by a utility provider and an output for outputting modified consumption data. The device further comprises a processor arranged to generate the modified consumption data based on the obtained consumption data and on a convergence factor stored in the device.

Any of the above devices may comprise an input for receiving the convergence factor and/or the above mentioned predetermined threshold.

The convergence factor may be a value based on which the processor generates a next modified consumption data point in a manner that seeks to eliminate or reduce a divergence between the consumption data and the modified consumption data. The convergence factor may, for example define an increase or decrease in the reporting of consumption of the utility, when compared to a preceding or the immediately preceding reported modified consumption data point.

While it can be desirable for convergence of the modified consumption data towards the consumption data to be relatively rapid, it is also envisaged that the modified consumption data can intentionally misrepresent the consumption data in a particular way, for example through over-representation of consumption of the utility, over prolonged periods of time and to then intentionally misrepresent consumption in a different way, for example by under-representation of the consumption of the utility, over a prolonged period of time. Misrepresenting consumption in this fashion enhances privacy/anonymises the consumption data. It is desirable that consumption is correctly represented at some stage to allow adequate determination of the actual consumption over a predetermined period of time.

According to another embodiment there is provided a device comprising an input for obtaining consumption data relating to the consumption of a utility provided by a utility provider and an output for outputting modified consumption data and a processor arranged to generate the modified consumption data based on obtained consumption data. The processor is arranged to calculate modified consumption data points so that at some times during the operation of the device the modified consumption data over-represents a consumed amount of the utility and at other times under-represents the consumed amount of the utility. The processor is further arranged to calculate the modified consumption data so that at predetermined time points or at the end of a predetermined period the consumed amount of the utility is correctly represented by the modified consumption data.

The device may further be arranged so that it makes a decision of whether or not convergence is necessary, for example as discussed above by using a predetermined threshold, and to determine the change factor that should be pursued/implemented for achieving such convergence if it is determined that convergence is necessary or desirable.

Another embodiment provides a device comprising an input for obtaining consumption data relating to the consumption of a utility provided by a utility provider and an output for outputting modified consumption data. The device also comprises a processor arranged to generate modified consumption data based on obtained consumption data. The processor is arranged to determine, based on previously obtained consumption data points and previously generated consumption data points, a change factor for use in generating one or more next modified consumption data points such that the modified consumption data converges towards the consumption data.

When determining the change factor the processor may simply choose whether or not a maximum allowable change factor is to be used or whether alternatively the modified consumption data is to be maintained at a previously established level. It will be appreciated that convergence can be achieved by maintaining the modified consumption data at the previously established level, if the actual consumption data is converging towards this level in any case. Maintaining the data at a previously established level for some time and subsequently using a maximum allowable change factor has the advantage that small changes in consumption (which may nevertheless give away information useful for the analysis of the type of a consumption event that has given rise to the (small) change in consumption) are simply eliminated from the modified consumption data. Any over and/or under representing of the power consumption can then be rectified using a predetermined change factor that is independent from any deviation between the actual consumption data and the modified consumption data. Using such a predetermined change factor has the advantage that it impedes data analysis algorithms that rely on the appearance of the edges of consumption peaks, increases or decreases for identifying an associated consumption event.

The change factor determined by the processor may alternatively be derived based on the consumption data, be that past and/or present consumption data, on past modified consumption data and/or on a deviation of past modified consumption data from past/present consumption data.

Any of the above devices may be smart meters for metering the consumption of electric energy or may be incorporated within such smart meters. Smart electricity meters are devices that automatically measure electricity consumption at regular intervals, say every minute, or even more frequently and report the amount of power consumed to the utility provider, for example in the form of a home load signature, such as those shown in FIGS. 1 and 2. The device of the embodiment may modify the operation of standard smart meters in any of the above discussed ways and allow the modified consumption data to be reported to the utility provider in the form of a modified home load signature. The present invention is, however, not limited to the smart metering of electricity and it is envisaged that other utilities, such as gas and water may be metered by a meter comprising a feedback mechanism that is arranged to report consumption back to the utility provider and for which a privacy protection mechanism of the above described nature is also provided. Smart meters may monitor utility consuming systems. Such systems may be an end consumer of power supplied through the power supply and can be a building or house, be provided or located within a building or house, be part of a building or house, be provided/located within a part of a building or house, be a household or form part of a household or be any other power consumer unit that may be individually monitored using a smart meter. It will, however, be appreciated that the present invention is not limited to smart meters per se. Devices that are arranged to be provided between an energy consuming system and a smart meter are also encompassed by the embodiments. Such devices can, for example be provided between a data detecting input of the smart meter and the power consuming system so that the device provides the modified power consumption data at the data detecting input of the smart meter. In this case the smart meter may be unaware of the presence of the device and report the modified consumption data as if it were real consumption data.

The processor can be arranged to determine the modified consumption data based on a number of consumption data points. The consumption data points can be consumption data points that have been sequentially obtained by a single metering device or by several metering devices that may operate in parallel. The consumption data points may alternatively be consumption data points obtained substantially simultaneously by several metering devices.

If the consumption data points have been obtained by several metering devices the controller may be arranged to generate the modified consumption data so that the sum of all modified consumption data points output at one time corresponds to the sum of al consumption data points upon which the modified consumption data points are based. In this case, and if all of the consumption data points have been obtained simultaneously, the overall power consumption reported to the utility provider by means of the modified consumption data points is the same overall power consumption that would have been reported had the original power consumption points been reported to the utility provider. In this case the utility provider receives accurate consumption data from the group of power consuming entities (e.g. buildings, households, businesses) that are jointly metered by the metering devices that have originally obtained/provided the consumption data. At the same time the load signatures of each of the metered entities can be modified in a manner that protects the privacy of the metered entities in the above described manner.

If the consumption data points that form the basis for the modified consumption data points have been obtained by several metering devices at several sampling data points, then the modified consumption data can be calculated so that the sum of all modified consumption data points for each metered consuming entity corresponds to the sum of all determined consumption data points for the metered consuming entity and so that the sum of all modified consumption data points at any time point corresponds to the sum of all metered consumption data points at the time point.

The device may further be arranged to cease modifying consumption data and to instead proceed to output unmodified consumption data following receipt of an override command. Such an override command may be received from the utility provider at times where the demands of the utility provider, for example demand associated with an electric power grid used or operated by the utility provider, are such that correct and unmodified consumption data must be obtained by the utility provider to ensure adequate operation of the utility providers operations. The device may comprise a notification mechanism for notifying a user or owner of the device of any overwrite events.

The device can further be arranged to store past consumption data and to output past consumption data following receipt of a command to provide past consumption data to the output.

The embodiments empower smart meters (and their users) to enforce their own privacy protection scheme, before data reach the utility provider. The embodiments can be implemented to meet (future) smart metering standards.

According to another embodiment there is provided a method of anonymising consumption data relating to the consumption of a utility provided by a utility provider. The method comprises storing rules for anonymising the consumption data, obtaining the consumption data through an input, using a processor to generate modified consumption data based on the consumption data and based on the rules and outputting the generated modified consumption data. The modification of the consumption data brings about a desired degree of anonymisation. The rules for anonymising may moreover be received from the utility provider or from a user.

According to another embodiment there is provided a method of anonymising consumption data relating to the consumption of a utility provided by a utility provider comprising obtaining the consumption data through an input, using a processor to generate modified consumption data based on the consumption data so that the modified consumption data starts to converge with the consumption data if a deviation of the consumption data from the modified consumption data exceeds a predetermined threshold and outputting the modified consumption data.

According to another embodiment there is provided a method of anonymising consumption data relating to the consumption of a utility provided by a utility provider. The method comprises obtaining the consumption data through an input, using a processor to generate modified consumption data based on the consumption data and on a stored convergence factor and outputting the modified consumption data.

According to another embodiment there is provided a method of anonymising consumption data relating to the consumption of a utility provided by a utility provider. The method comprises obtaining the consumption data through an input, using a processor to generate modified consumption data based on the consumption data so that at some times the modified consumption data over-represents a consumed amount of the utility and at other times underrepresents the consumed amount of the utility and so that at predetermined time points or at the end of a predetermined period the consumed amount of the utility is correctly represented. The method further comprises outputting the modified consumption data.

According to another embodiment there is provided a method of anonymising consumption data relating to the consumption of a utility provided by a utility provider. The method comprising obtaining the consumption data and using a processor to determine, based on previously obtained consumption data points and previously generated modified consumption data points, a change factor for use in generating one or more next modified consumption data points such that the modified consumption data converges towards the consumption data. The method further comprises using the processor to generate one or more next modified consumption data points based on the consumption data and on the change factor and outputting the generated one or more next modified consumption data points.

The above description focuses on the modification of consumption data. The data modified in the above description is the data that would, were it not for the above described modifications, be reported to a third party such as the utility provider. The consumption data, however, is to be understood as data reflecting the amount of the utility provided to an end consumer by the utility during certain time frames. This amount may differ from the actual amount of the utility consumed by an end consumer in the time frame. It can, for example, be envisaged that part of the end consumer's consumption is satisfied by a storage device for storing the utility. Such a storage device may be used to satisfy the consumption during a time frame in question, so that the thus satisfied part of the consumption will never be reported to the utility provider. The storage device may then be re-charged during a subsequent time frame. A system for re-routing stored energy within an end consumer is also being proposed by inventors of the embodiment, G. Kalogridis and C. Efthymiou in a co-pending patent application by the present assignee entitled "Apparatus and Method for Privacy-Driven Moderation of Metering Data". This co-pending application is incorporated herein in its entirety by this reference. It will be appreciated that the above described methods of data modification/scrambling will act on consumption data reflecting the amount of the utility that is provided to the system of the co-pending application, irrespective of the actual utility consumption within that system, if the above described ways of modifying data for modifying consumption data are used in conjunction with the system of the co-pending application.

Figure 2:
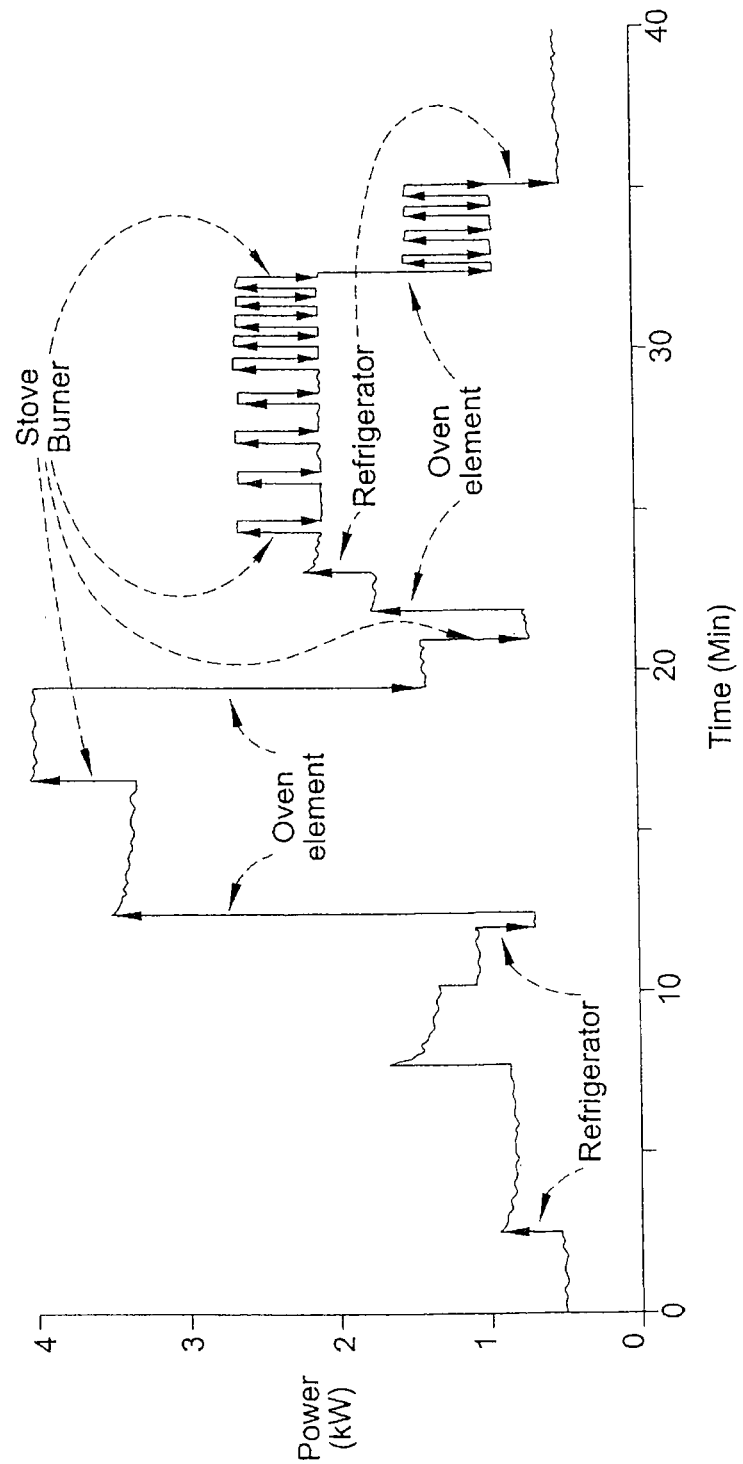
FIG. 2 shows step changes in a household's load signature due to individual appliance events.
Figure 3:
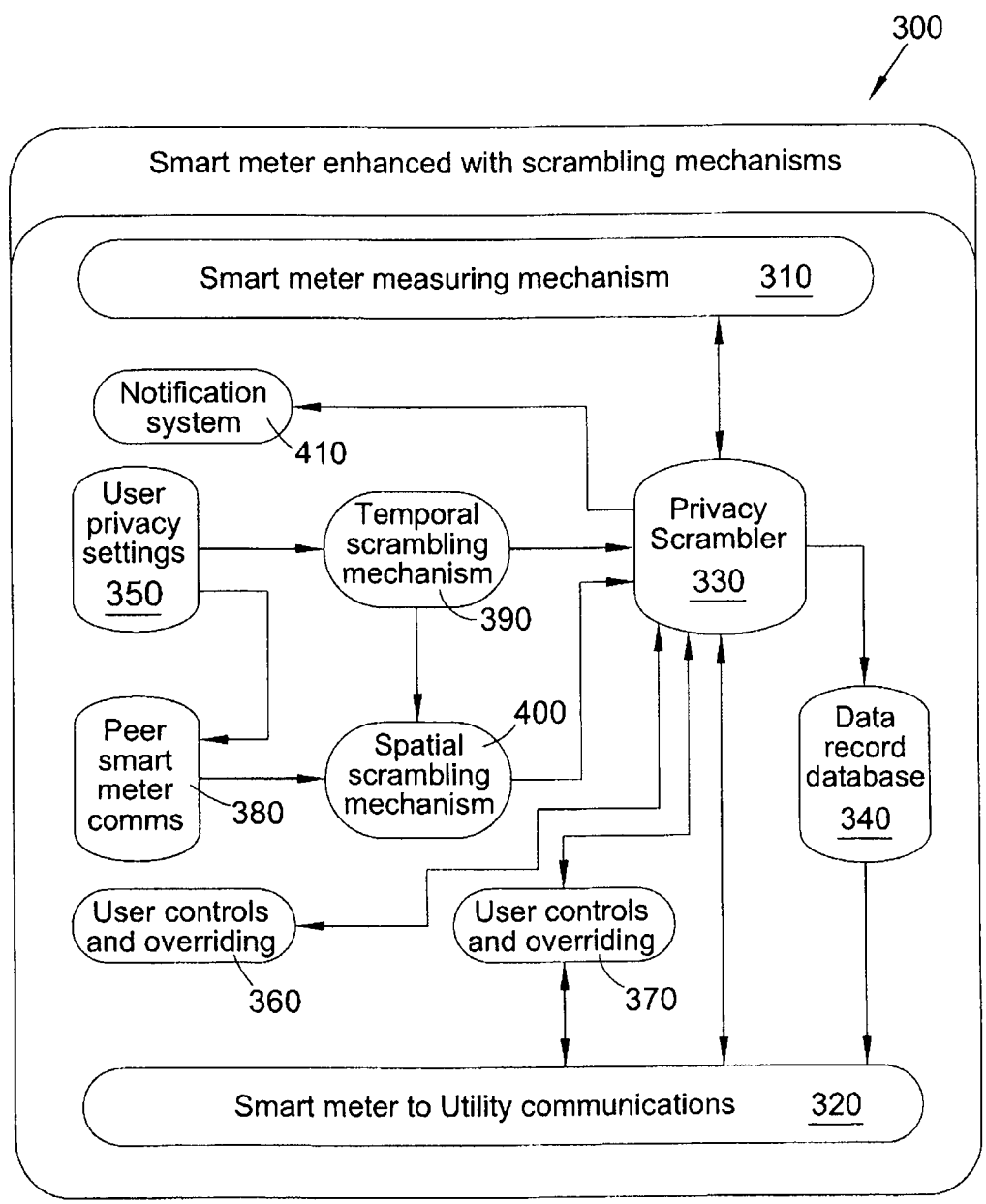
FIG. 3 shows the architecture of a privacy enhanced smart meter.

An embodiment will be described in the following by way of example. FIG. 3 shows the architecture of a privacy enhanced smart meter 300 according to the embodiment. The smart meter 300 comprises a measuring mechanism 310 for measuring power consumption. Such measuring mechanisms are well known in the smart meter art as well as in standard power meters and will not be described in more detail in the present application. The smart meter 300 further comprises a smart meter to utility communication interface 320. Communication interfaces 320 of this nature are again well known from standard smart meters. These communication interfaces 320 facilitate data communication with third parties, such as with the utility provider. Such data communication can include the transmission of metering data yielding load signatures, such as the load signatures shown in FIGS. 1 and 2 from the smart meter to the third party as well as the receipt of commands from the third party. Relevant commands may include a command to store grid energy in energy storage devices in the building (or, more generally, end consumer) metered by the smart meter or to make any such stored energy available to the grid.

In a standard smart meter, however, a measuring mechanism directly communicates with a communication in interface. This is not the case in the smart meter 300 of FIG. 3. In the smart meter 300 the measuring mechanism 310 communicates with the communications interface 320 via the privacy scrambler 330. The privacy scrambler 330 obtains the metering/consumption data from the measuring mechanism 310, alters the data in a manner described in more detail below and sends the modified metering/consumption data to the communications interface 320. The privacy scrambler 330 is further arranged to store a log of its activities alongside the original metering/consumption data and, if desired also the modified consumption data, in the data record database 340. The original consumption data may be stored so that each data entry comprises is associated with a time stamp. This data may be stored for a period of time set by the user or defined by the utility provider.

The privacy scrambler 330 is moreover arranged to send the original consumption data, either in real time as received from the measuring mechanism 310 or as stored in the database 340, to the communication interface 320 if a command to provide such data is received from an authorised entity, for example through the communication interface 320 from a third party such as the utility provider or from the user/owner of the smart meter 300. If the original consumption data is provided to an outside of the smart meter 300, then the user/owner of the smart meter 300 is notified of this.

The smart meter 300 also comprises a memory 350 storing user privacy settings that can be input and/or modified by the user. The user privacy settings govern the scrambling operation of the privacy scrambler 330, when the privacy scrambler 330 is activated. The user privacy settings may include scrambling factors the user may wish to employ in modifying the metered data, as discussed in more detail below. The smart meter 300 may be arranged to receive user privacy settings for storage in the memory 350 through a separate user interface, such as the user control and overriding interface 360. The user control and overriding interface 360 may be a simply user interface, for example comprising buttons or a touch screen, that facilitates user input. Alternatively or additionally the user control and overriding interface 360 can comprise a communications interface for communicating with a user controllable device outside of the smart meter 300, such as a wireless communication interface, or may facilitate connection to a network through which user control and overriding commands can be received for implementation or storage. A further interface 370 for receiving control and overriding commands from the utility is also provided. Both interfaces 360 and 370 operate with secure access control. A further memory or memory section 380 stores rules that govern the way the smart meter 300 coordinates scrambling with peer (neighbouring) smart meters, if such coordination is desired. The memory or memory section 380 may further be communicatively connected to a communications interface that can facilitate communication between peer/neighbouring smart meters for coordinated scrambling. The temporal scrambling mechanism 390 orchestrates scrambling of smart metering data in time, as required, and the spatial scrambling mechanism 400 orchestrates scrambling of smart metering data by a group of collaborating smart meters, as required. The notification system 410 maintains a log of important activities of the privacy scrambler 330, such as time windows within which certain privacy settings applied, or certain events, such as overriding controls, that occurred. The notification system 410 is arranged to alert the user, if required, either for informative purposes or to prompt use input and/or other action.

The operation of the temporal scrambling mechanism will be described in more detail in the following with reference to FIG. 4 and the code provided in Table I. The smart meter 300 of the embodiment is required by the utility to send metering data to the utility at regular time intervals Δt. The smart meter 300 is moreover required by the utility to send accurate smart metering data to the utility at regular time intervals T, where T>Δt. In one embodiment the consumption data the smart meter 300 sends to the utility provider refer to energy meter readings. These data can be expressed in units of kWh.

In a first step 410 of the scrambling programme checks if an override command has been received, for example from the utility provider (e.g. via interface 370 of FIG. 3) or form the user (e.g. via interface 360 of FIG. 3). If it is determined that an override command has been received, the scrambling algorithm is terminated (at least for the time being, until the override command no longer applies), via a step 430 in which a user is notified of the override (through the notification system 410) and in which real time measurements obtained by the measuring mechanism 310 are reported to the utility through the communication interface 320. If no override has been received the time period that forms the basis for the operation of the smart meter is set to zero in step 440. This initialisation step 440 defined the starting point of the time period T, by the end of which the correct amount of consumed energy is required to be reported, as discussed above. The scrambling method is then repeated until the timer t has reached the end of the time period T. This termination criterion is checked in step 450.

While the scrambling method is intended to scramble the power consumption data to anonymise the data in a manner that maintains and protects the user's privacy, it is desirable for a divergence between the reported data/modified consumption data (which provides a modified indication of the amount of energy consumed by the metered entity to the utility provider between the initialisation time point t=0 and the current time point t) and the metered consumption data to be no larger than a maximum value. It is equally desirable for a deviation of the reporting data from the actual metered data to be within a certain limit, for example expressed as a percentage of the actual metered value. Keeping the deviation between the metered consumption data and the reported modified consumption data within predetermined bounds, ensures that modified consumption data provided by the smart meter 300 to the utility provider can be relied upon by the utility provider, at least to within a known and predetermined degree of uncertainty, for operation of the utility provider's network/the power grid.

The modified consumption data will in the following be referred to as A(t). The modified consumption data A(t) indicates the amount of energy that the smart meter 300 has reported as having been consumed between the start t=0 of the time period T and the current point in time t. A difference between a previous modified consumption data value A(t−1) and a current modified consumption data value A(t) will be referred to as a differential modified consumption value dA(t)=A(t)−A(t−1). The differential modified consumption value corresponds to the amount of energy reported to have been consumed in the time period Δt, between time points t−1 and t.

The actual/metered consumption data will in the following be referred to as R(t). The consumption data R(t) indicates the amount of energy that has been consumed between the start t=0 of the time period T and the current point in time t. A difference between a previous consumption data value R(t−1) and a current consumption data value R(t) will be referred to as a differential consumption value dR(t)=R(t)−R(t−1). The differential consumption value dR(t) corresponds to the amount of energy consumed during the time period Δt, between time points t−1 and t.

The above mentioned bounding condition can be expressed as:

$$|dA(t)-dR(t)|<M$$

where M is a maximum metering divergence factor allowed by the utility company, or set by the user.

This condition thus limits the deviation of the amount of reported energy consumption in the time period Δt between time points t−1 and t from the actual amount of energy consumed in this time period to less than M. M is defined as shown in the algorithm of Table I, so that the modified home load signature is considered to be unduly divergent from the actual/measured home load signature if the deviation between the modified consumption data and the actual consumption data is 10% or more. If the divergence of the measured/actual and the reported/modified differential consumption data is expressed as a percentage of the actual consumption data for the time period Δt, between time points t−1 and t, then the boundary condition can be expressed as:

$$|dA(t)-dR(t)|/dR(t)<MF$$

where MF is a maximum metering divergence factor allowed by the utility company, or set by the user.

If the values R(t) of the metered consumption data and the values A(t) of the modified consumption data are such that the two numbers converge or so that they are not separated unduly, then it is not necessary for steps for improving convergence to be taken. The algorithm of FIG. 4 checks this criterion in step 460. The details of this step can be seen in Table I, function CheckConvergence. This function checks in a first step if the percentage deviation Abs(R(t−1)−A(t−1))/R(t) of the previously reported modified consumption data point A(t−1) from the previous measured actual consumption data R(t−1) is smaller than 10% (MF=0.1). If this is the case, and if the percentage difference Abs(dR(t)−dA(t−1))/dR(t) of the amount of energy dR(t) consumed in the current period Δt between time points t−1 and t and the amount of energy dA(t−1) reported to have been consumed in the previous period Δt between time points t−2 and t−1, is less than 10% (SF=0.1), then the algorithm considers the measured and reported differential consumption data to be sufficiently convergent. There is then no need to correct any small divergence of these two signature curves that may nevertheless exist. It is in fact of interest for any such divergence not to be corrected, to aid anonymisation of the consumption data. If not correction is required, the amount of energy consumption measured for the time period Δt between time points t−1 and t, dR(t)=R(t)−R(t−1), is used for generating the new modified consumption value A(t) based on the previous modified consumption value A(t−1) by the function Calibrate in step 470 according to:

$$A(t)=R(t)-R(t-1)+A(t-1)$$

It will be appreciated that in this case the current part of the reported home load signature simply extends in parallel to the current part of the actual/metered home load signature.

Should the convergence criterion defined in the function CheckConvergence, as tested in step 460, not be fulfilled, then steps 480 to 540 are used to improve the convergence of the integral of the modified home load signature (i.e. the total amount of the modified consumed energy within the period [0, t]) with the integral of the actual home load signature (i.e. the total amount of the actual consumed energy within the period [0, t]). In a first step, step 480 it is determined (using the function CheckNegDiverg of Table I) whether or not the previously reported consumption value A(t−1) is smaller than the previously metered consumption value R(t−1). Put in other words, step 480 checks if the last reported modified value underrepresented the actual amount of energy consumed. Should this be the case, it is further considered in step 490 (by invoking function CheckNegDiffDiv of Table I) if the amount dR(t) of energy consumed in the current period Δt (between time points t−1 and t) exceeds the amount of energy dA(t−1) reported as having been consumed the previous period Δt (between time points t−2 and t−1). Should this be the case, the underreporting of the amount of energy consumed is deemed to deteriorate and needs to be corrected. This correction is effected in step 500 by invoking the function IncreaseDiff detailed in Table I. In this routine the modified amount of energy dA(t) that will next be reported as having been consumed is set to be larger than the previously reported amount of energy dA(t−1) that has been reported as having been consumed. The factor used for increasing the reporting amount is SR, defined as 0.1 in the algorithm of Table I. The function IncreaseDiff thus causes an increase of 10% in the amount of energy that is reported as having been consumed in the current period Δt (between time points t−1 and t), when compared to the previous period Δt (between time points t−2 and t−1).

It will be appreciated that, even if the reported amount of energy consumed in the current period Δt (between time points t−1 and t) is increased in this manner the actual and reported consumption data will not necessarily converge. If, for example, a sudden increase in actual energy consumption occurs (as may be caused by the activation of a large energy consumer, such as a washing machine or a kettle), then even the 10% increase in the amount of energy that is being reported as having been consumed will be unable to cause convergence between the actual and the reported consumption data. In cases where the sudden energy consumption has a short duration, the actual home load signature curve will, however, simply comprise a consumption spike and consequently automatically approach the modified home load signature of its own accord after a short delay. In this case the energy consuming event has been successful disguised by the algorithm of FIG. 4. If the energy consuming event is of longer duration, then successive 10% increases of the amount of energy reported as being consumed cause convergence of the two signature curves. It will be appreciated that in this latter case characteristic edges within the home load signature curve are blurred or smoothed, thereby making it more difficult for such edges to be detected and attributed to the use of specific energy consuming devices.

If the function CheckNegDiff returns FALSE in step 490, then the underreporting of the amount of energy consumed is deemed to be automatically improved/reduced by changes in the amount of energy dR(t) consumed in the current time period Δt (between time points t−1 and t). In this case reporting that the amount of energy dA(t) consumed in the current time period Δt (between time points t−1 and t) is the same as the amount of energy dA(t−1) reported as having been consumed in the previous time period Δt (between time points t−2 and t−1) will facilitates convergence of the actual/measured consumption data and of the reported/modified consumption data. This is achieved by the function Maintain detailed in Table I and invoked in step 510 of FIG. 4.

Returning now to the check of step 480 of whether or not the amount of energy A(t−1) last reported as having been consumed is smaller than the actual amount of consumed energy R(t−1), if the function CheckNegDiverg determines that the amount of energy that has actually be consumed R(t−1) is not larger than the amount of energy A(t−1) last reported as having been consumed, that is if it is determined that the amount of energy reported as having been consumed over-represented the actual amount of energy that had been consumed, then the function CheckNegDiffDiv is also invoked, this time in step 520. As discussed above, the function CheckNegDiffDiv checks if the amount dR(t) of energy consumed in the current period Δt (between time points t−1 and t) exceeds the amount of energy dA(t−1) reported as having been consumed the previous period Δt (between time points t−2 and t−1). Should this be the case, maintaining the reported amount of consumed energy dA(t) for the current time period Δt (between time points t−1 and t) at the level of the amount of energy dA(t−1) reported as having been consumed in the previous time period (between time points t−2 and t−1) is likely to automatically cause convergence of the actual/measured consumption data and the reported/modified consumption data. In this case, the function Maintain is consequently invoked again, this time in step 530.

If the amount dR(t) of energy consumed in the current period Δt (between time points t−1 and t) exceeds the amount of energy dA(t−1) reported as having been consumed the previous period Δt (between time points t−2 and t−1), as determined by the function CheckNegDiffDiv in step 520, then the over-reporting of the amount of energy consumed is deemed to deteriorate and needs to be corrected. This correction is effected in step 540 through the function DecreaseDiff detailed in Table I. The function DecreaseDiff reduces the amount of energy reported as having been consumed by a factor defined, again, by SF. The reduction in reported energy consumption over the current time period Δt (between time points t−1 and t) in the algorithm of Table I is thus 10%. It will again be appreciated that such a reduction may not necessarily cause convergence of the reported consumption data with the actual/measured consumption data in cases where the amount of energy consumed suddenly drops. In these cases, however, if the amount of energy consumed after the drop does not fluctuate wildly, convergence will be achieved by successive invocations of the function DecreaseDiff. A temporary drop in energy consumption will be smoothed over and convergence is achieved by the repeated increase in actual power consumption.

The time t is increased by one time period Δt after either of steps 470, 500, 510, 530 and 540 have been taken and after an appropriate waiting period, if necessary. If it is determined in step 450 that the end of the time period T has been reached, the amount of energy A(T) reported as having been consumed in the time period T has to correspond to the actual amount of energy R(T) consumed. The value A(T) is adjusted to fulfil this requirement in step 560, using the function Adjust detailed in Table I.

It will be appreciated from the above that the algorithm of the embodiment seeks to cause convergence of the reported/modified consumption data and of the actual/measured consumption data. Divergence between the two numbers is automatically created by changes in actual power consumption. The algorithm of Table I achieves the desired convergence by checking if a divergence between the two numbers is large enough to warrant correction (step 460) and by checking if the development in power consumption is such that convergence can be achieved by simply reporting a steady power consumption (step 490 returning FALSE and step 520 returning TRUE respectively). As discussed above but repeated here in condensed form, if correction is deemed not to be warranted in step 460, the reported power consumption is simply set to track the actual power consumption at whichever small difference may be existing at the moment. If the actual power consumption is found (in steps 490 and 520 respectively) to be such that it is likely to automatically rectify an under- or over-reporting of energy consumption, then the amount of energy reported as having been consumed in the last period Δt is set to be the same as that reported as having been consumed in the period Δt preceding the last period Δt. If it is determined (in steps 490 and 520 respectively) that a large over- or under-reporting of energy consumption will not be rectified by current developments in energy consumption, then the amount of over- or under-reporting of energy consumption is reduced in the above described manner.

It will be appreciated that in the above example the factors SF and MF are set to impose a 10% divergence limit that triggers activation of the convergence algorithm described above with respect to steps 480 to 540 of FIG. 4 and to cause a 10% change in the amount of energy consumption reported where appropriate. The factor MF simply defines a band within which divergence between reported and actual consumption data is acceptable. This band may be defined by the utility provider or, in the absence of such a definition (or indeed if the user would prefer a narrower band), be set by the user/owner of the smart meter. It will be appreciated that the MF=0.1 value is merely provided in the algorithm of Table I to provide an illustration of one way of implementing an appropriate algorithm and that the present invention is by no means limited to the use of this value. The factor SF determines the rapidity of convergence between the two numbers. It will again be appreciated that the SF=0.1 value is merely provided in the algorithm of Table I to provide an illustration of one way of implementing an appropriate algorithm and that the present invention is by no means limited to the use of this value. An increase in either or both of SF and MF will increase privacy protection at the cost of metering accuracy.

The level of privacy protection achieved can be measured in different manners. For example, privacy can be measured with the use of standard NALM algorithms. Alternatively privacy can be measured by comparing the degree dA(t) differs from dR(t). The exact methodology used for measuring privacy protection is not important to the present invention and may differ for different applications and user privacy requirements.

TABLE I

```
#Definitions
dR(t)=R(t)-R(t-1);
dA(t)=A(t)-A(t-1);
SF=MF=0.1;
# Expressions
CheckConvergence:
    ( Abs(R(t-1)-A(t-1))/R(t) < MF
    && Abs(dR(t)-dA(t-1))/
       dR(t) < SF )
Calibrate:
    A(t)= R(t)-R(t-1)+A(t-1);
CheckNegDiverg:
    R(t-1) > A(t-1)
CheckNegDiffDiv:
    dA(t-1) < dR(t)
IncreaseDiff:
    dA(t) = (1+SF) dA(t-1);
Maintain:
    dA(t) = dA(t-1);
DecreaseDiff:
    dA(t) = (1-SF) dA(t-1);
Adjust:
    A(t)=R(t);
```

TABLE I-continued

```
# Program SM_scrambling;
begin
    while NoOverride do
    begin
        Initialise (t=0);
        while t<T do
        begin
            if CheckConvergence then
            begin
                Calibrate;
            end
            else
            begin
                if CheckNegDiverg then
                begin
                    if CheckNegDiffDiv then
                    begin
                        IncreaseDiff;
                    end
                    else
                    begin
                        Maintain;
                    end;
                end
                else
                begin
                    if CheckNegDiffDiv then
                    begin
                        Maintain;
                    end
                    else
                    begin
                        DecreaseDiff;
                    end;
                end;
            end;
            t++;
        end;
        Adjust;
    end;
end.
```

Figure 4:
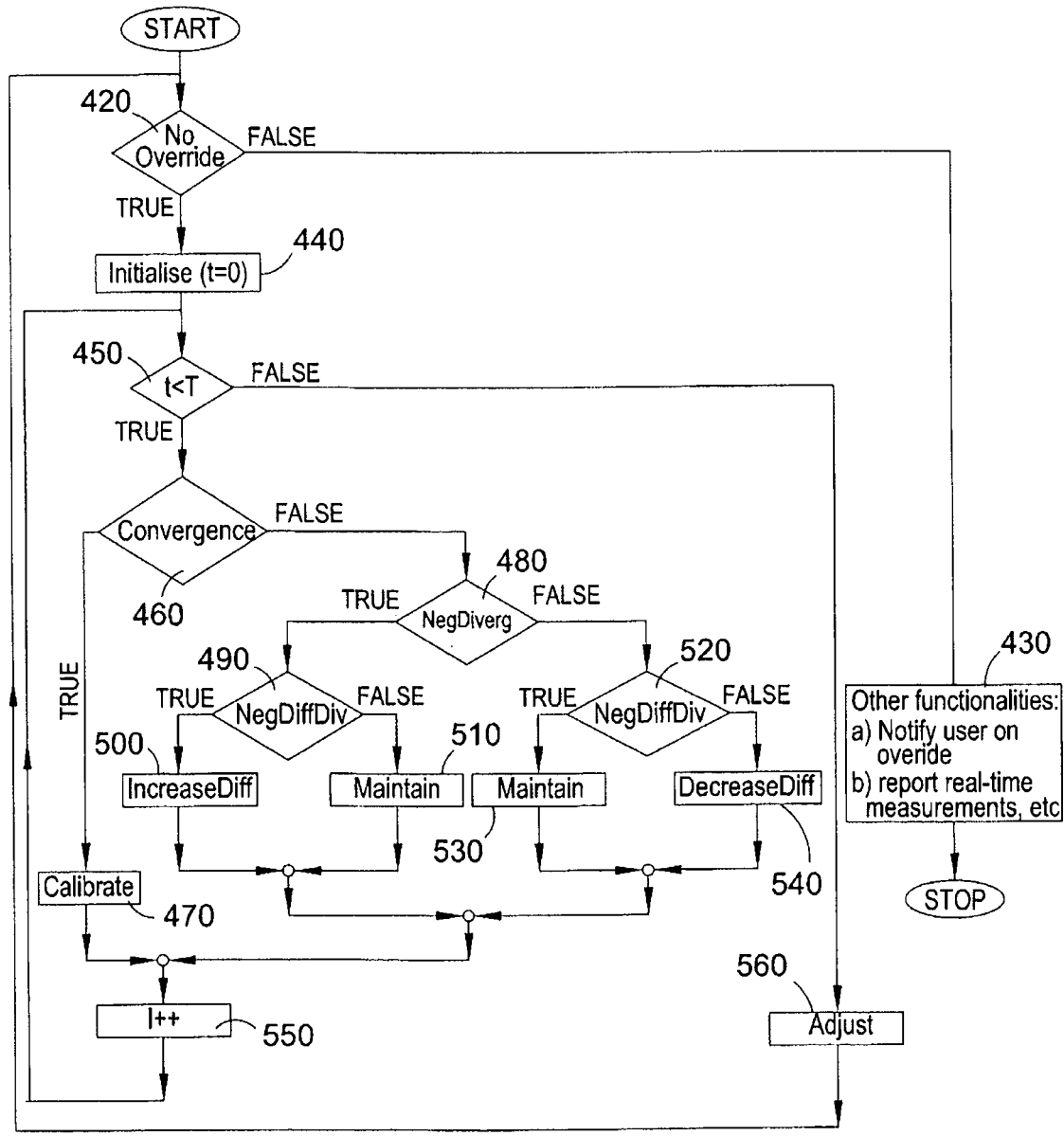
FIG. 4 shows a flow chart of a scrambling algorithm.
Figure 5:
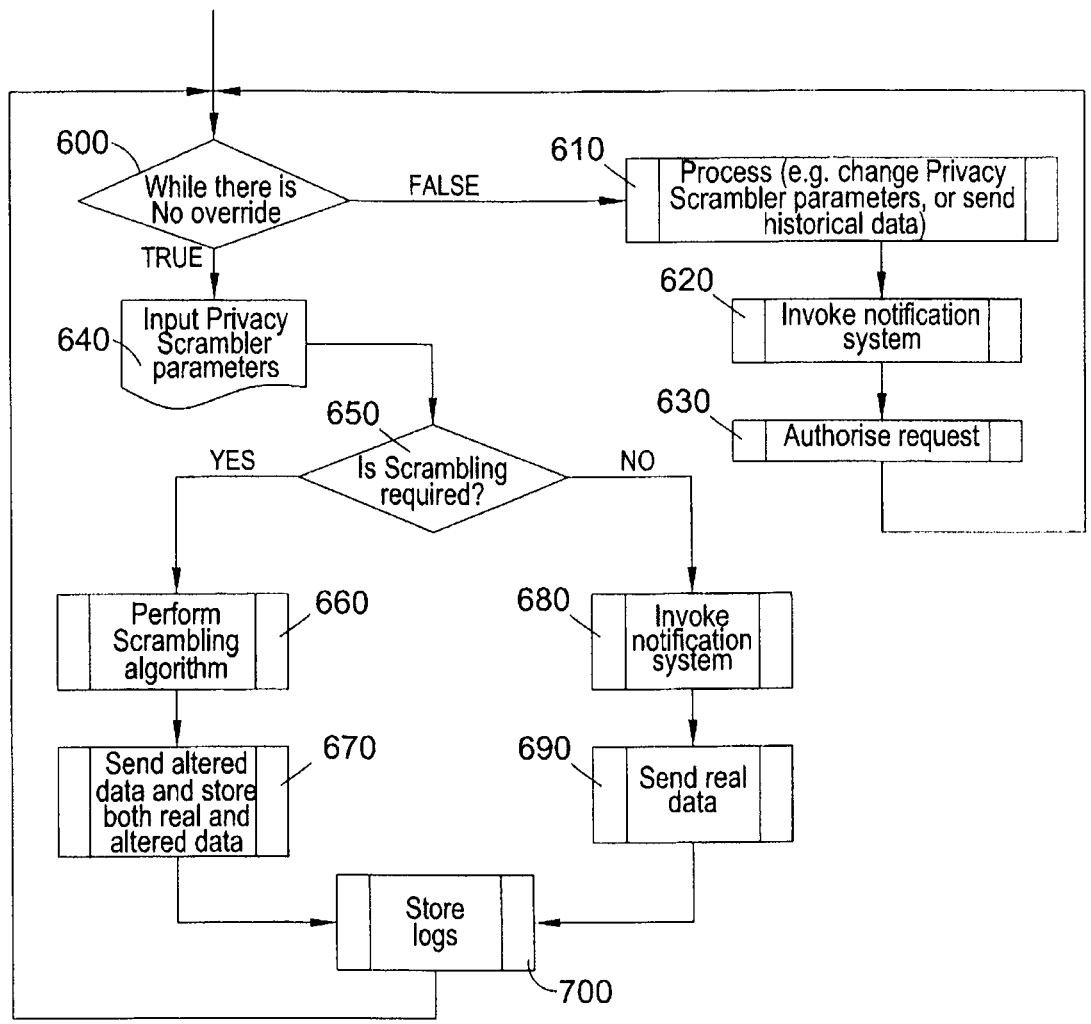
FIG. 5 shows a flow chart of a scrambling system.

FIG. 5 shows a scrambling system that can incorporate a scrambling algorithm, such as the scrambling algorithm shown in FIG. 4. In a first step 600, the system checks whether or not there is an overwrite command. If the FIG. 4 algorithm is implemented, then step 600 corresponds to step 420 of FIG. 4. If an overwrite command has been received by the system a command received with the overwrite command is executed in step 610. This step 610 can correspond to step 430 shown in FIG. 4, if the FIG. 4 scrambling algorithm is implemented in the system of FIG. 5. Commands for execution may include a command to change the operating parameters of the privacy scrambler, for example the parameters stored in the memories 350 or 380 of FIG. 3, a command causing the transmission of historical data or indeed the transmission of real time measurement data.

In step 620 a notification is invoked. As discussed above, the notification system 410 notifies the user of the overwrite operation. In step 630 the override command will need to be either accepted or rejected as appropriate by the system. For example, requests could comprise either proposed or enforcing commands originating from either the user of the utility. Enforcing commands originating from the utility with appropriate credentials may be automatically authorised, whereas other commands may require manual authorisation, e.g. by means of password or PIN.

If no overwrite command has been received, the privacy scrambler (for example the privacy scrambler 330 shown in FIG. 3) obtains the parameters it requires to implement a desired scrambling algorithm. These parameters may be stored in the memory comprising the user privacy settings 350 or in the peer smart meter comms 380 shown in FIG. 3.

It is then determined, in step 650, if scrambling is at all required. This decision can correspond to the decision made in step 460 of FIG. 4. Should scrambling be required, then a desired scrambling algorithm is implemented is step 660. This scrambling algorithm can comprise steps 470 to steps 540 shown in FIG. 4. In step 670 the altered/scrambled data is sent to a third party/to the utilities provider and a log of the actions taken is stored in step 700. This log may be stored in the data record database 340 shown in FIG. 3.

If it is determined in step 650 that no scrambling is required, then the user may be notified of this decision in step 680 and real time data may be sent in step 690. The FIG. 5 system differs in this respect from the FIG. 4 algorithm. As discussed above, in the FIG. 4 algorithm, if it is determined that the consumption data and the modified consumption data are sufficiently convergent, then the modified consumption data is not modified further to correspond to or converge towards the consumption data. Instead, the altered home load signature is allowed to simply track the measured home load signature, accepting any slight discrepancy between the two load signatures that may exist (in step 470 of FIG. 4).

The above description of an embodiment focuses on the operation of a single smart meter. Further benefits may be derived from operating a number of smart meters, such as a group of neighbours, in concert. For example, a group of readings $\{R_1(t), R_2(t), \ldots, R_G(t)\}$ obtained from smart meters 1 to G can be modified to form a group of modified consumption values $\{A_1(t), A_2(t), \ldots, A_G(t)\}$ so that the sum of all $R_x(t)$ equals to the sum of all $A_x(t)$ at any given time t. Spatial scrambling of this nature is governed by the Peer smart meter comms 380 and the Spatial scrambling mechanism 400 shown in FIG. 3. Alternatively, a combination of temporal scrambling, as discussed above with reference to FIG. 4 and spatial scrambling, as discussed here, may be used. It should be appreciated that apart from its privacy benefits spatial scrambling can also be desirable in terms of smart grid stability and power management as it can further reduce aggregate divergence.

Example Implementation of the FIG. 4 Algorithm

Figure 6:
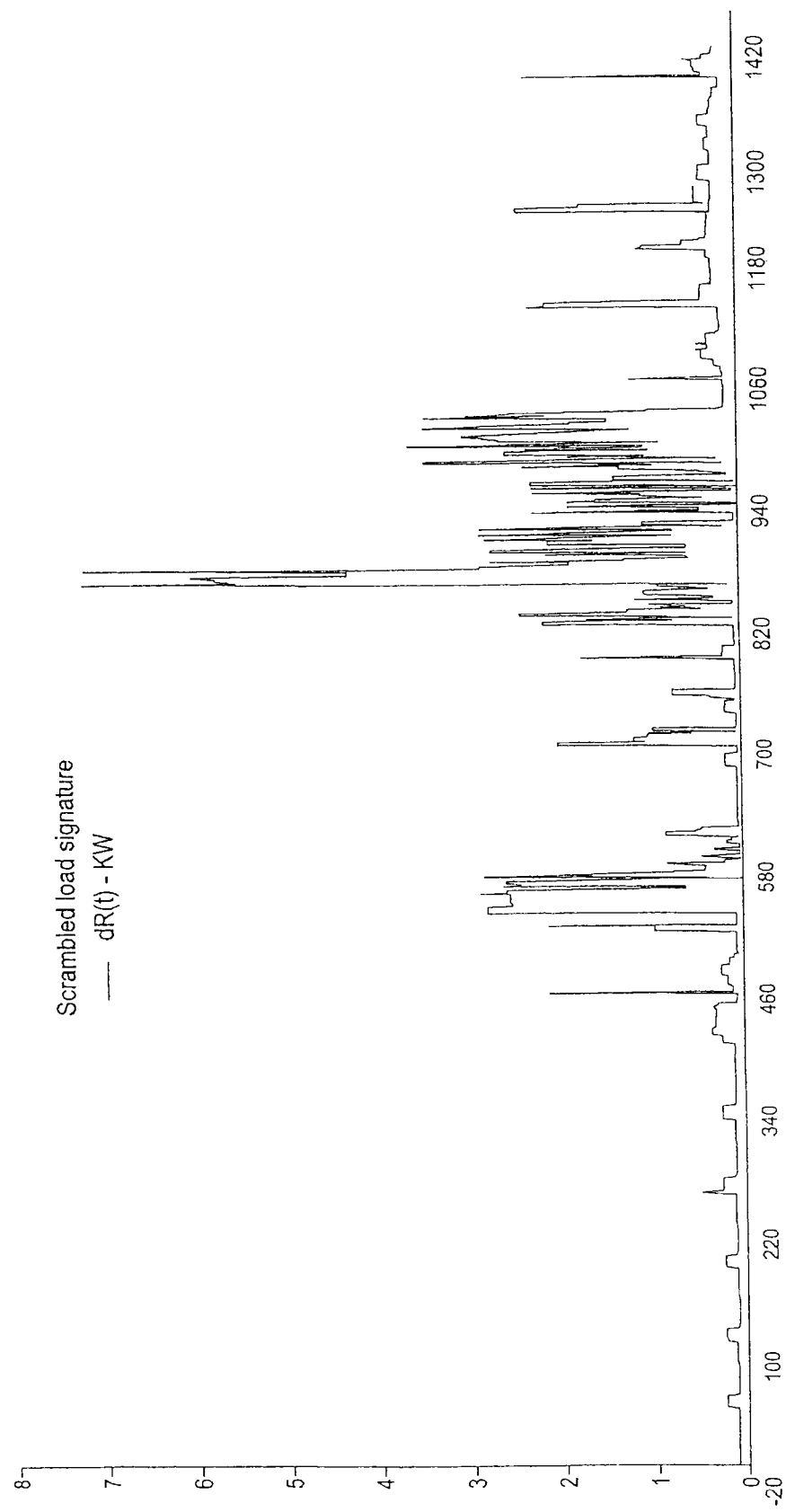
FIG. 6 shows a reconstruction of the Household Load Signature of FIG. 1, as used as input for the simulations that have produced the results illustrated in FIGS. 7 to 14.

FIG. 6 shows a home load signature derived from FIG. 1 and comprises data values obtained at 1 minute intervals ($\Delta t=1$ minute). The algorithm described with reference to FIG. 4 and Table I has been applied to this load signature and compared with the application of 5, 10 and 20 minute averaging filters.

Figure 7:
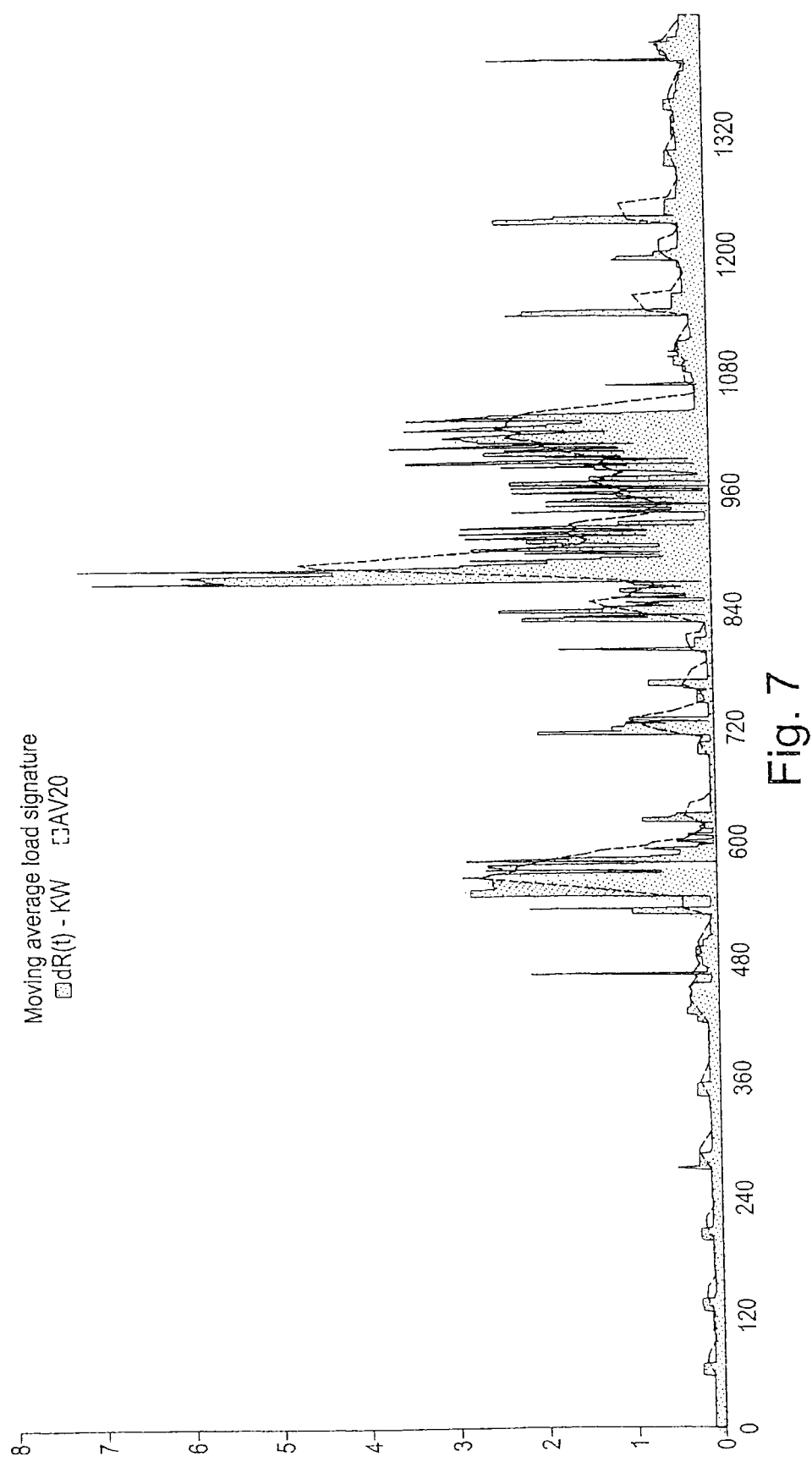
FIG. 7 shows the Household Load Signature of FIG. 6 as well as a 20 minutes moving average thereof.
Figure 8:
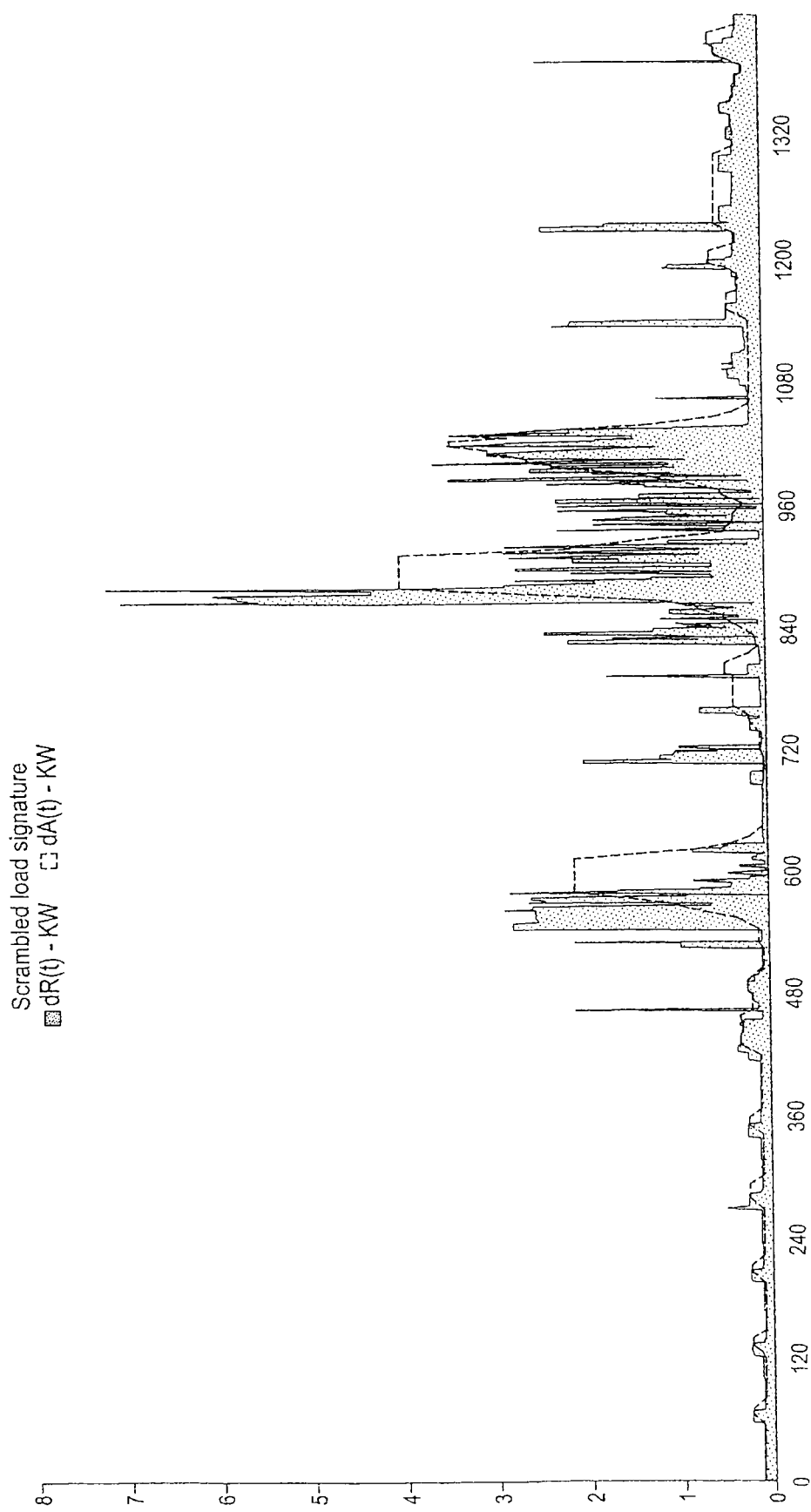
FIG. 8 shows the Household Load Signature of FIG. 6 and the same load signature after application of the scrambling algorithm shown in FIG. 4.
Figure 9:
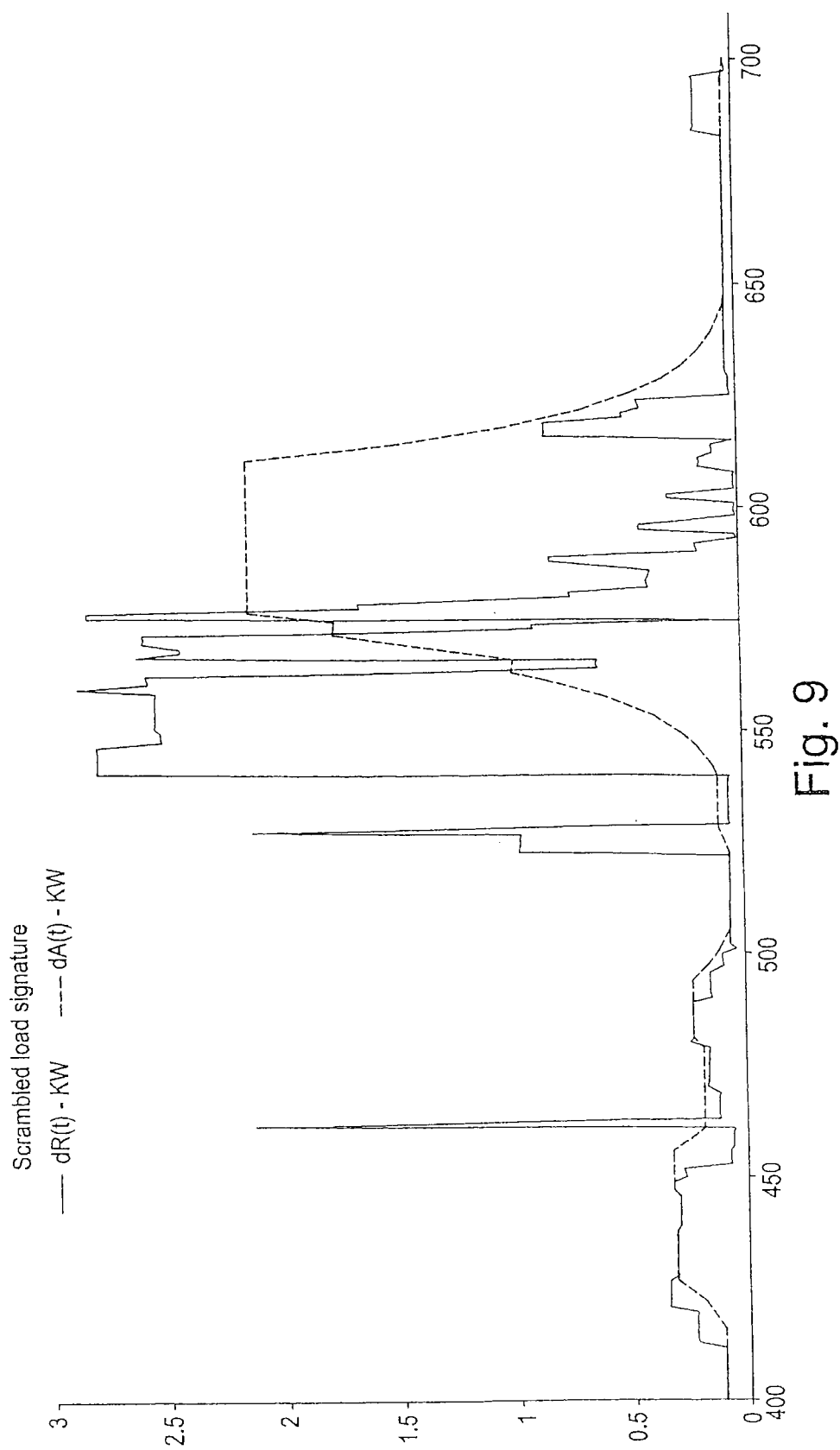
FIG. 9 shows the 400 to 700 minute time window of FIG. 8 in more detail.
Figure 10:
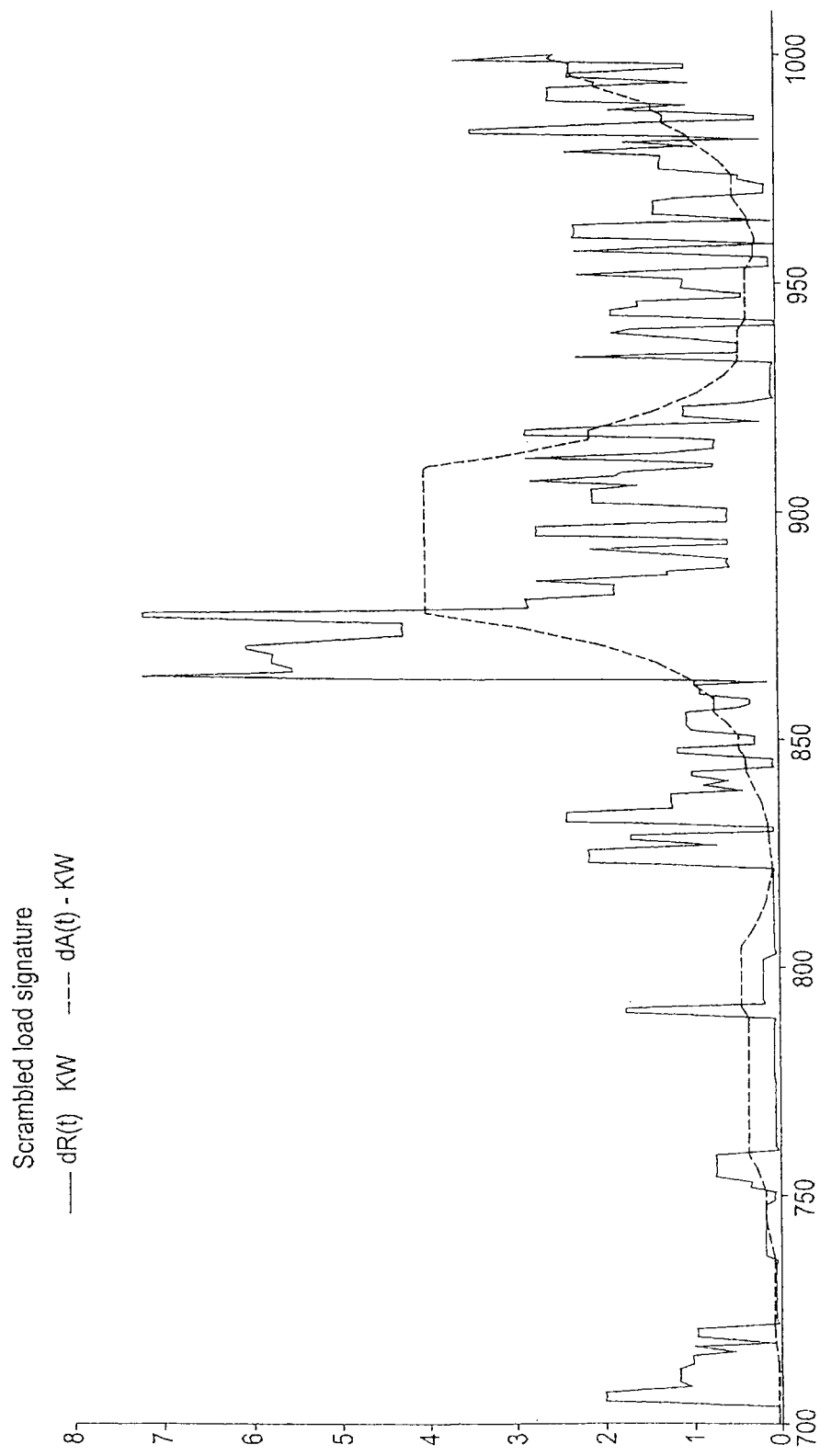
FIG. 10 shows the 700 to 1000 minute time window of FIG. 8 in more detail.
Figure 11:
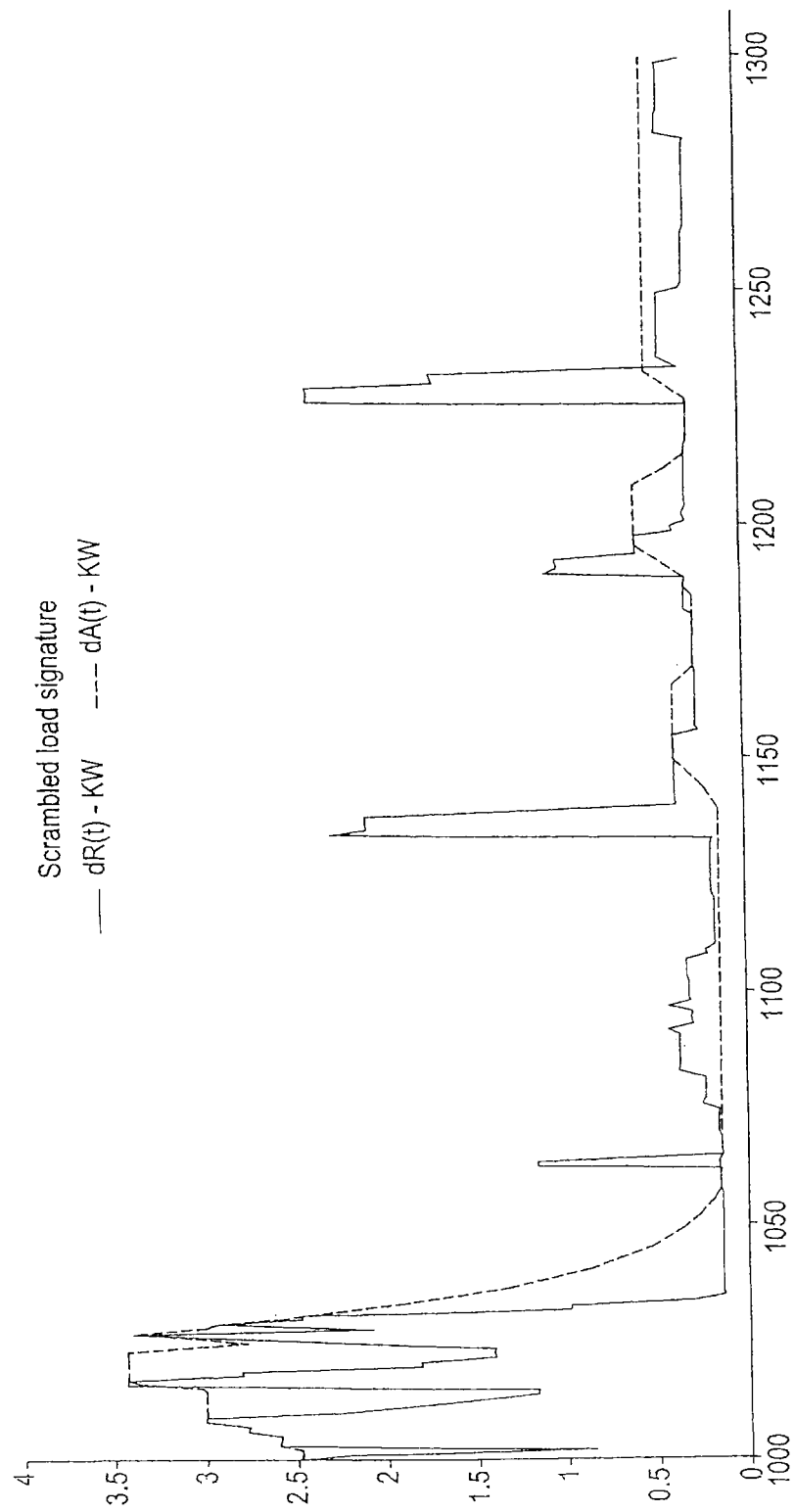
FIG. 11 shows the 1000 to 1300 minute time window of FIG. 8 in more detail.
Figure 12:
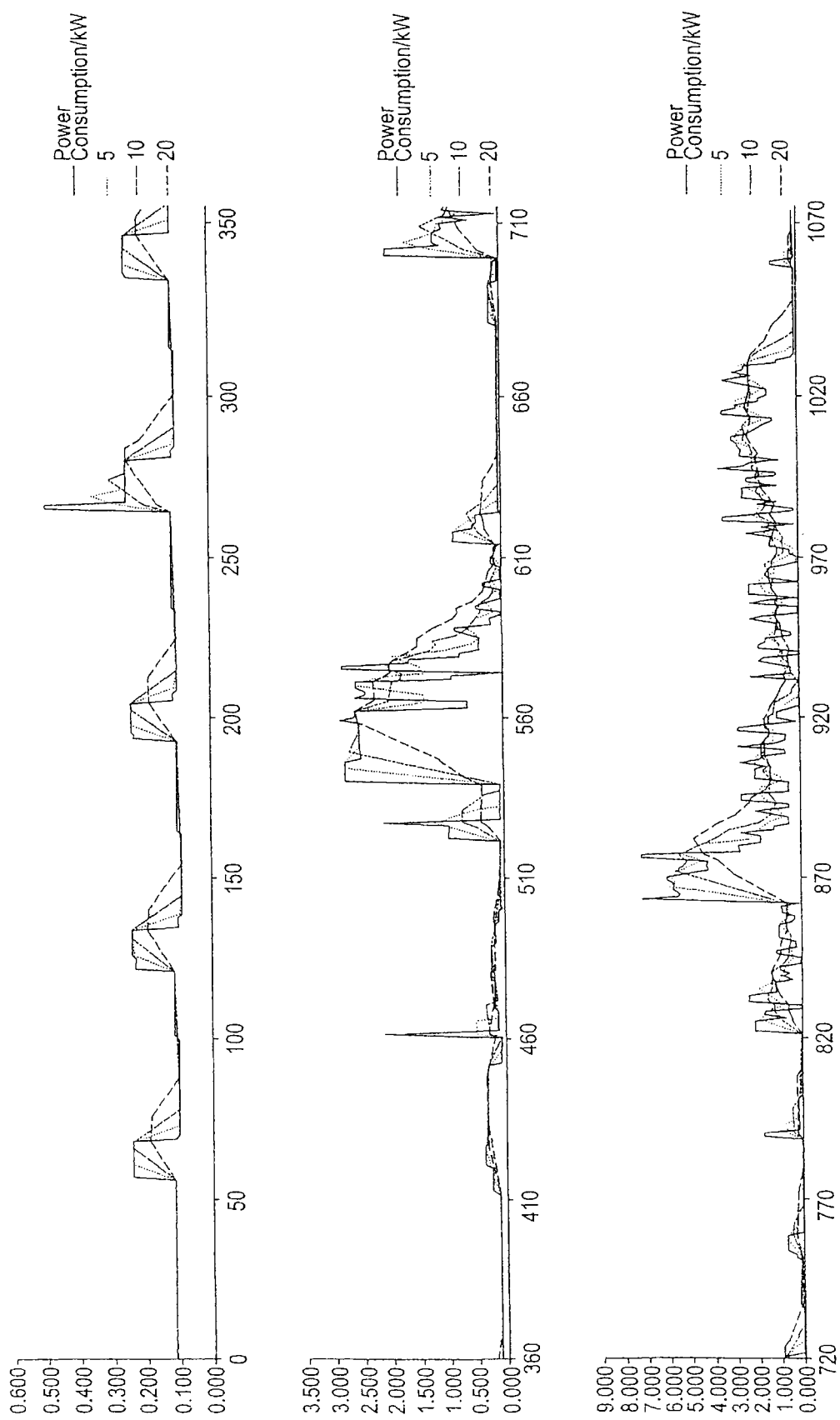
FIG. 12 shows the Household Load Signature of FIG. 6 as well as curves generated by applying 5, 10 and 20 minutes moving average algorithms respectively.

The result of a 20 minute average filter is shown in FIGS. 7 and 12, superimposed over the actual home load signature of FIG. 6. The result of an operation of the FIG. 4 scrambling algorithm is shown in FIG. 8, again superimposed over the actual home load signature of FIG. 6. FIGS. 9, 10 and 11 are expanded parts of FIG. 8, showing details of the time period between 400 and 700 minutes (FIG. 9), between 700 and 1000 minutes (FIG. 10) and between 1000 and 1300 minutes (FIG. 11). A comparison of FIG. 7 with FIGS. 8 to 11 clearly indicates that, while a moving average filter manages to smooth/broaden sudden/short energy consumption events, the moving average filter nevertheless tracks the measured home load signature. Moreover, a moving average algorithm is subject to reverse engineering, so that a third party could derive the actual home load signature from the averaged home load signature.

The algorithm of FIG. 4, in contrast, while inevitably still tracking the actual home load signature to some degree (as intended to lend the degree of dependability to the reporting of energy consumption that may be required by the utility provider) provides output/modified values that do not directly depend on the actual power consumption values. For this reason, the algorithm of FIG. 4 is not subject to reverse engineering of the actual home load signature from the reported home load signature. As can be seen from FIGS. 8 to 11, the algorithm of FIG. 4 successfully hides power consumption peaks and moreover maintains a steady reporting level over several minutes/periods $\Delta t$, in cases where a deviation between the actual energy consumption level and the modified energy consumption level is deemed acceptable. Providing these plateaus can hide several smaller consumption spikes, as can be seen in detail in FIGS. 9 to 11.

Figure 13:
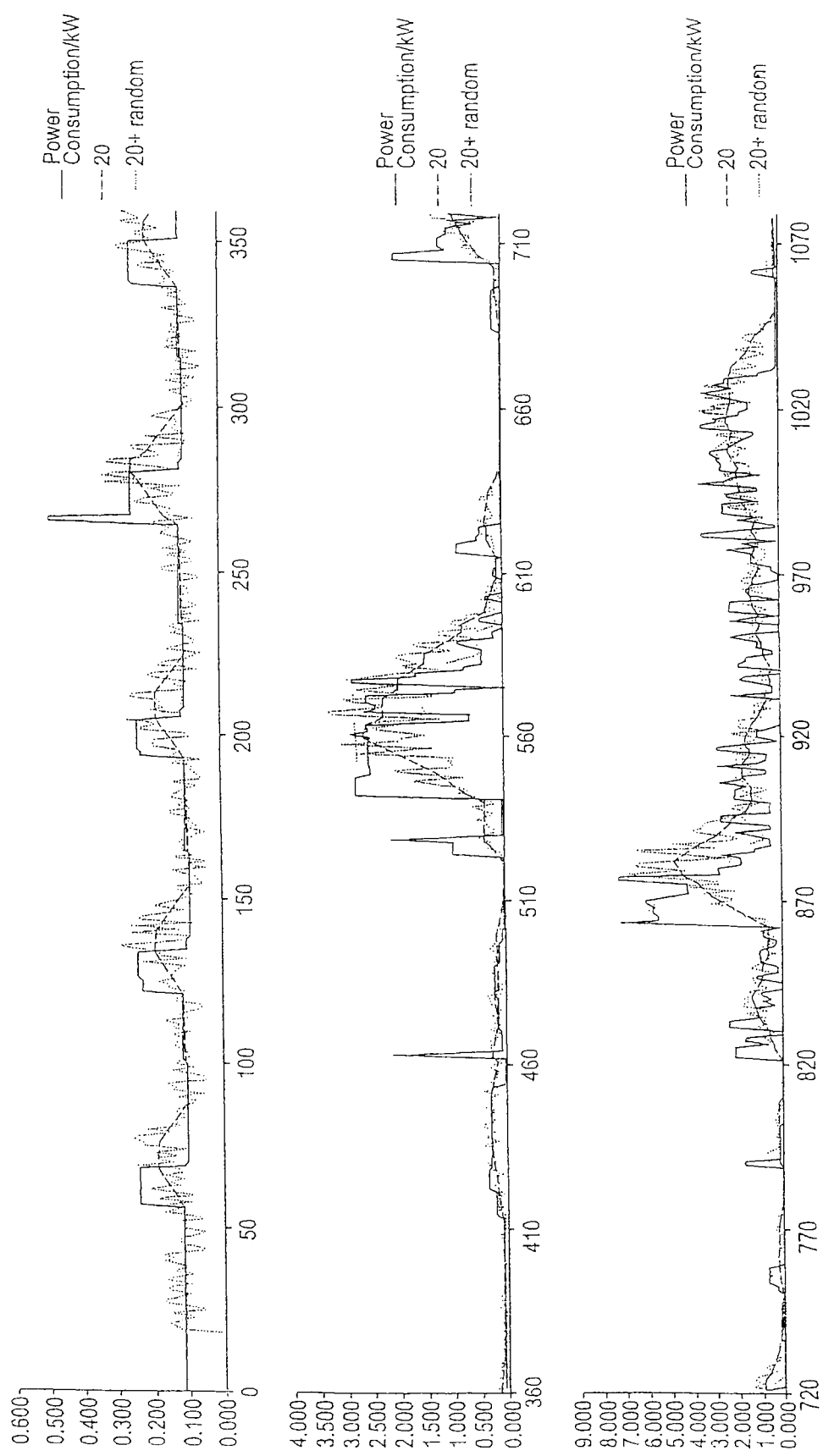
FIG. 13 shows the Household Load Signature of FIG. 6 as well as a curve generated by applying a 20 minutes moving average algorithm with 50% random fluctuations.

FIG. 13 shows a further use of moving average filters, wherein the dotted line comprises 50% random noise superimposed over the output of the moving average filter. While a moving average filter including added random noise improves privacy protection, the advantage offered by the addition of random noise can potentially be removed using a low pass filter, providing a load signature that can be reverse engineered.

Figure 14:
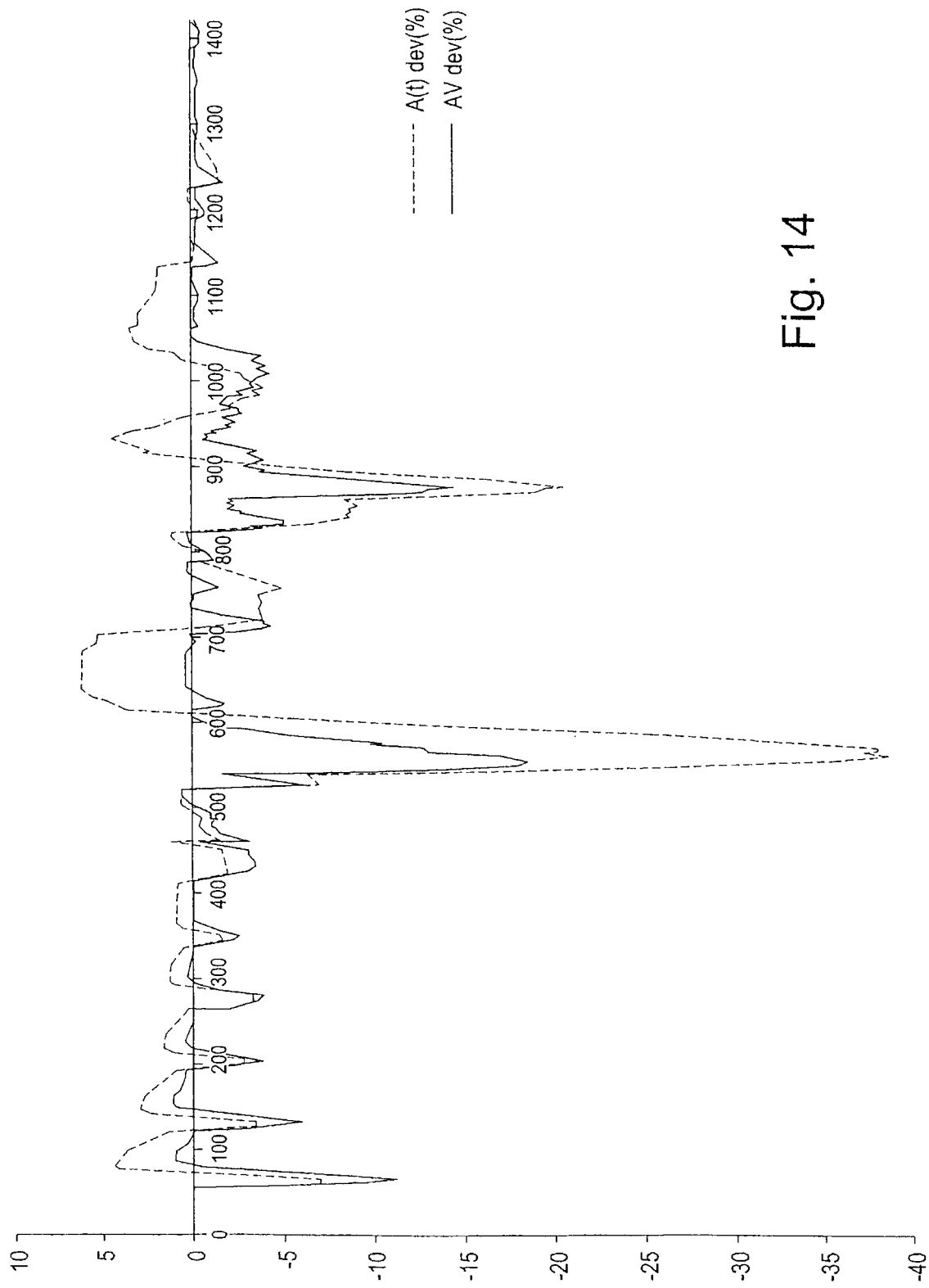
FIG. 14 shows a percentage of divergence of scrambling algorithm metering values A(t) from real metering values R(t) by using a) modified step scrambling algorithm and b) 20 minute moving average scrambling algorithm.

FIG. 14 compares the convergence provided by the FIG. 4 algorithm with the convergence provided by a 20 minute moving average filter. It can be seen from FIG. 14 that convergence of the FIG. 4 algorithm substantially corresponds to the convergence of the moving average algorithm. However, while the 20 minute moving average filer (solid line in FIG. 14) simply tracks the home load signature, the algorithm of FIG. 4 combines periods of considerable over-reporting of energy with periods of considerable under-reporting of the energy used. The algorithm of FIG. 4 consequently provides supreme privacy protection, when compared to a 20 minute moving average algorithm. Substantial coincidence of the two curves in FIG. 14 indicate that neither the moving average algorithm, nor the algorithm shown in FIG. 4 allows an absolute deviation of the modified consumption data from the consumption data. This renders the algorithm of FIG. 4 utility friendly while still providing improved privacy protection.

Returning now to FIG. 10 and referring also to the FIG. 4 algorithm, between time 820-880 minutes, the values of the modified/reported consumption curve increases (10% every one minute) because the real metering differentials have suddenly increased, causing a large divergence. This increase is caused by invoking of the function IncreaseDiff of the FIG. 4 algorithm/Table I. By the time the modified consumption signature ramps up, however, the actual consumption signature (around time 880 minutes) drops. In order to stop the modified consumption curve from increasing further (and consequently aggregating an undesirable integration difference), the modified consumption curve is kept constant using the function Maintain of Table I. Around 910 minutes (zero divergence), the modified consumption curve is caused to decrease (by the function DecreaseDiff) because a positive divergence is now piling up.

While the above description is made with reference to a smart meter that has been enhanced to include an embodiment, it will be appreciated that embodiments can also be provided in separate devices that can be located on the consumer side of a standard smart meter, so that the device measures power consumption itself and modifies the measured power consumption data before sending it on to the smart meter. A device of this nature can also be arranged to accept commands from the smart meter so that the correct power consumption data can be exported/sent to a third party that may rightfully be demanding the delivery of such data.

While certain embodiments have been described, these embodiments have been presented by way of example only, and are not intended to limit the scope of the invention. Indeed, the novel methods and apparatus described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A smart meter comprising:
an input port;
an output port; and
a processor configured to,
obtain through the input port, at each time point of a series of points in time, first data representing an amount of a utility provided by a utility provider and consumed by a consumer since a preceding time point in the series of points in time;
periodically scramble after predetermined periods of time the first data to over-represent or under-represent the consumed amount of the utility for anonymization of the first data, and to generate second data representative of the scrambled first data,
determine if a deviation between a value of said first data at a first point in time and corresponding second data at the first point in time exceeds a predetermined threshold,
when it is determined that a deviation between a value of said first data at the first point in time and corresponding second data at the first point in time exceeds the predetermined threshold, alter over or under-representation of the first data in generation of the second data so that the second data obtained at a second point in time subsequent to the first point in time converge with the first data and so that at the predetermined periods of time or at the end of a predetermined period, the second data correctly represent long term consumption of the utility, and
sending the second data to the utility provider using the output port.

2. The smart meter according to claim 1, wherein the processor is operative to determine, based on first data obtained at a third point in time that precedes the first point in time and second data calculated for the third point in time, a change factor for use in generating one or more next second data such that the one or more next second data converges towards the first data.

3. The smart meter according to claim 1, wherein said processor is operative to determine said second data based on a number of obtained first data points obtained by a single metering device or by several metering devices or first data points obtained substantially simultaneously by several metering devices.

4. The smart meter according to claim 1, wherein said processor is further operative to cease modifying first data and to output unmodified first data following receipt of an override command.

5. The smart meter according to claim 1, wherein said processor is further operative to store past obtained first data and to output the stored past obtained first data following receipt of a command to provide the stored data to the output port.

6. A method performed in a smart meter having an input port, an output port, and a processor, comprising:
obtaining through the input port, at each time point of a series of points in time, first data representing an amount of a utility provided by a utility provider and consumed by a consumer since a preceding time point in the series of points in time;
using the processor, scrambling the first data, after predetermined periods of time, to over-represent or under-represent the consumed amount of the utility for anonymization of the first data, and generating second data representative of the scrambled first data;
using the processor, determining if a deviation between a value of said first data at a first point in time and corresponding second data at the first point in time exceeds a predetermined threshold;
when it is determined that a deviation between a value of said first data at the first point in time and corresponding second data at the first point in time exceeds the predetermined threshold, using the processor, altering over or under-representation of the first data in generation of the second data so that the second data obtained at a second point in time subsequent to the first point in time converge with the first data and so that at the predetermined periods of time or at the end of a predetermined period, the second data correctly represent long term consumption of the utility; and
sending the second data to the utility provider using the output port.

7. The method according to claim 6, further comprising:
receiving a command to output past first data; and
storing past first data and outputting past first data following receipt of the command to output past first data.

8. The method according to claim 6, further comprising:
receiving an override command; and
outputting unmodified first data following receipt of the override command.

* * * * *